(12) United States Patent
Piazzese et al.

(10) Patent No.: US 8,019,030 B2
(45) Date of Patent: Sep. 13, 2011

(54) RECONFIGURABLE ALAMOUTI/ABBA DECODER CIRCUIT, SYSTEM, AND METHOD

(75) Inventors: Nicolo' Ivan Piazzese, Acireale (IT); Francesco Maria Virlinzi, Enna (IT); Alberto Serratore, Trecastagni (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 686 days.

(21) Appl. No.: 12/152,860

(22) Filed: May 15, 2008

(65) Prior Publication Data
US 2008/0285680 A1    Nov. 20, 2008

(30) Foreign Application Priority Data

May 15, 2007  (EP) .................................... 07108234

(51) Int. Cl.
*H04B 7/10* (2006.01)
*H04L 1/02* (2006.01)
(52) U.S. Cl. ........ 375/347; 375/267; 375/346; 375/260; 375/349; 455/500; 455/101; 370/203
(58) Field of Classification Search .................. 375/267, 375/260, 299, 347, 346, 349; 455/500, 101; 370/203
See application file for complete search history.

(56) References Cited

U.S. PATENT DOCUMENTS

| 6,865,237 | B1 | 3/2005 | Boariu et al. | |
| 7,483,364 | B2* | 1/2009 | Jeon et al. | 370/203 |

OTHER PUBLICATIONS

European Search Report; EP 07 10 8234; Oct. 18, 2007.

* cited by examiner

*Primary Examiner* — Phuong Phu
(74) *Attorney, Agent, or Firm* — Lisa K. Jorgenson; Kevin D. Jablonski; Graybeal Jackson LLP

(57) ABSTRACT

A decoder apparatus for decoding a first input set of demodulated data elements obtained by demodulating transmitted data elements received over a transmission channel so as to obtain a corresponding output set of decoded data elements. The decoder apparatus includes a first register a first selector coupled to the first register, a second selector coupled to the second register, and a combiner coupled to the first and the second selection circuits and operable to combine selected demodulated data elements with selected channel description elements. The decoder apparatus still further includes a controller coupled to the first and second selectors and to the combiner, that is adapted to generate a plurality of signals defining a control sequence for driving the first and second selectors and the combiner. Said controller is adapted to be configured so as to generate at least two control sequences according to the selected transmission diversity scheme.

20 Claims, 7 Drawing Sheets

RECONFIGURABLE ALAMOUTI/ABBA DECODER CIRCUIT, SYSTEM, AND METHOD

PRIORITY CLAIM

This application claims priority from European patent application No. 07108234.1, filed May 15, 2007, which is incorporated herein by reference.

TECHNICAL FIELD

Embodiments of the present invention generally relate to the telecommunication field. More particularly, embodiments of the present invention relate to a decoder apparatus for decoding space-time block coded wireless transmissions.

BACKGROUND ART

In wireless communication networks, such as cellular networks like those complying with the UMTS (Universal Mobile Telecommunication Standard), the transmission channel on which data streams are transmitted suffers from attenuation due to destructive addition of multipaths in the propagation media (i.e., the air) and to interference from other users. Moreover, the transmitted data streams have to travel across a potentially harsh environment, experiencing scattering, reflection, refraction and so on, and they may be corrupted by thermal noise.

In order to overcome these problems, a known wireless transmission technique provides for encoding the data to be transmitted exploiting a so-called Space-Time Block Code (STBC). By using an STBC, the data to be transmitted is encoded in blocks; then, multiple copies of the data stream (formed by copies of said blocks) are transmitted by means of a plurality of antennas. In this way, by exploiting the various received versions of the data stream it is possible to greatly improve the reliability of the transmission. Using multiple antennas at the receiver side further improves the performances.

The transmission of different copies of the data stream is also known as "transmission/reception diversity scheme". This technique has been studied extensively because it is considered relatively simple to have multiple transmitting antennas. The "diversity gain" provides an indication of the reliability of this method. Briefly, the diversity gain represents the increase in the signal-to-interference ratio due to the adopted diversity scheme, or how much the transmission power can be reduced when the diversity scheme is introduced, without a performance loss.

In order to exploit this technique in a mobile wireless network (e.g., a network that adopts a Code Division Multiple Access—CDMA—modulation scheme), the mobile terminals (e.g., mobile phones) have to be equipped with dedicated hardware capable of performing proper combining and/or selecting operations on the various received versions of the data stream, in order to improve the quality of the received data. This dedicated hardware is expensive, both in terms of cost and power consumption.

A simple transmission diversity scheme proposed by Alamouti provides for the use of two antennas on the transmitter side. The diversity gain that can be obtained using the Alamouti scheme is equal to that achievable by applying a Maximal Ratio Receiver Combining (MRRC) with two antennas on the receiver side.

The Alamouti scheme is less complex than the known diversity schemes that adopt space-time trellis coding. However, this greater simplicity implies a loss of performance, that in some cases might not be acceptable. In order to improve the performance of the transmission, a similar transmission diversity scheme can be exploited using more than two transmitting antennas. For this purpose, in order to have the highest possible diversity gain (and, consequently, the highest performances) a mobile terminal on the receiver side needs to be equipped with hardware resources adapted to receive and decode data streams transmitted exploiting different transmission diversity schemes. Indeed, a mobile terminal specifically designed for receiving and decoding data streams transmitted and coded with, e.g., only the Alamouti scheme, is not capable of guaranteeing a high diversity gain in case the transmission is performed by a different number (e.g., four) of antennas on the transmitter side.

SUMMARY

The Applicant has observed that all the present known solutions for implementing receiver apparatuses for wireless communication networks that are adapted to receive and decode data streams transmitted exploiting more than one transmission diversity scheme are not efficient. Indeed, in all the present solutions, the receiver apparatuses include multiple replicas of the hardware dedicated to the implementation of the decoding operations on the received data stream. More particularly, in order to obtain a sufficiently high diversity gain, for each transmission diversity scheme that can be adopted on the transmitter side, each receiver apparatus should include a dedicated decoding hardware. Naturally, the presence of these multiple dedicated hardware greatly increases the complexity of the receiver apparatuses, and, more significantly, the cost and power consumption thereto. This drawback is exacerbated in case of mobile wireless networks, wherein the receiver apparatuses are mobile terminals with reduced hardware resources.

Embodiments of the present invention improve the efficiency of known receiver apparatuses for wireless communication networks by providing a decoding circuit adapted to decode data streams transmitted with different transmission diversity schemes, which at the same time allows for reducing the cost and the power consumption thereof.

According to an embodiment of the present invention, a decoder apparatus for decoding a first input set of demodulated data elements obtained by demodulating transmitted data elements received over a transmission channel so as to obtain a corresponding output set of decoded data elements is provided. The decoder apparatus includes a first register operable to receive the demodulated data elements of the first input set and a second register operable to receive a second input set of channel description elements related to the transmission channel. The number of demodulated data elements of the first input set and the number of channel description elements of the second input set is equal to a first number that depends on a selected transmission diversity scheme selected among at least two transmission diversity schemes that can be adopted for the transmission of the transmitted data elements. The decoder apparatus further includes a first selector coupled to the first register and operable to select the demodulated data elements from the first input set, a second selector coupled to the second register and operable to select the channel description elements from the second input set and a combiner coupled to the first and the second selection circuits and operable to combine the selected demodulated data elements with the selected channel description elements. The decoder apparatus still further includes a controller coupled to the first and second selectors and to the combiner, that is adapted to generate a plurality of signals defining a control sequence for driving the first and second selectors and the combiner. The controller is adapted to be configured so as to generate at least two control sequences according to the selected transmission diversity scheme.

DETAILED DESCRIPTION OF AN EMBODIMENT OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
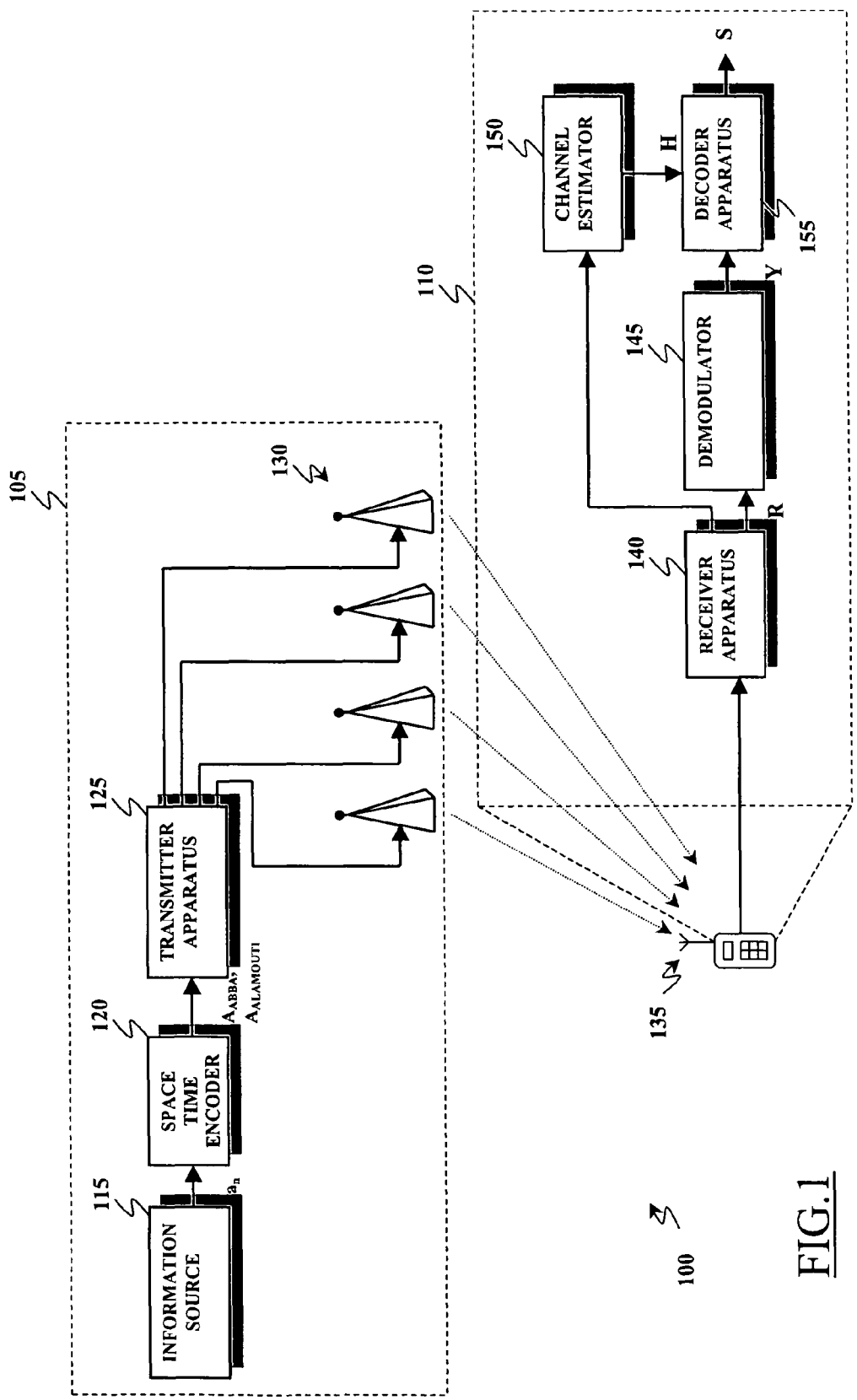
FIG. 1 schematically illustrates the main functional components of a wireless telecommunication system in which a decoder apparatus according to an embodiment of the present invention can be used.

With reference to the drawings, FIG. 1 schematically shows, in terms of functional blocks, the main functional components of a wireless telecommunication system 100 in which, on a receiver side, a decoder apparatus according to an embodiment of the present invention can be used.

In FIG. 1, the wireless telecommunication system 100 is schematized by a transmitter side 105 and a receiver side 110. As will be described in the following description, for the sake of simplicity, the transmitter side 105 is assumed to include only a single transmitter apparatus, and the receiver side 110 is similarly assumed to include only a single receiver apparatus. However, this is not to be construed limitatively, and in a practical implementation more than one transmitter apparatus interacts with more than one receiver apparatus. This is for example the case in a mobile wireless network, such as a cellular network, wherein the transmitter side 105 may represent the base station of a radio cell, and the receiver side 110 corresponds to the mobile terminals located in the radio cell and that are in communication with the base station.

The wireless telecommunication system 100 adopts the CDMA modulation scheme, according to which the bandwidth of the signal to be transmitted is widened through a so-called "spreading" coding process, and then the signal is further subjected to a "scrambling" process, adapted to identify the transmission source.

More particularly, on the transmitter side 105, the wireless telecommunication system 100 includes an information source block 115 adapted to generate a data stream $a_n$ (n=1 to L), formed by a succession of digital symbols, that carries information to be transmitted to the receiver side 110.

The data stream $a_n$ is provided to a space-time encoder block 120, whose purpose is to process blocks of symbols of the data stream $a_n$ and encode them according to a selected transmission diversity scheme. The space-time encoder block 120 is adapted to carry out known spreading and scrambling process operations on the data stream $a_n$, according to the CDMA modulation scheme adopted by the wireless telecommunication system 100. Furthermore, the space-time encoder block 120 is adapted to encode the data stream $a_n$ according to different selectable transmission diversity schemes. More particularly, it is assumed that the space-time encoder block 120 is capable of encoding the data stream $a_n$ following two different diversity schemes, as described hereinafter.

According to a first transmission diversity scheme implemented by the space-time encoder block 120, hereinafter referred to as "Alamouti scheme", The data is transmitted by means of two transmitting antennas. According to this scheme, the symbols of the data stream $a_n$ are subdivided in blocks formed by two consecutive symbols in the stream. Then, each block is encoded into a 2×2 code using the following encoding matrix:

$$F_{ALA}(a_1, a_2) = \begin{pmatrix} a_1 & a_2 \\ -a_2^* & a_1^* \end{pmatrix}, \tag{1}$$

wherein $a_1$ and $a_2$ are the generic two consecutive symbols of the data stream $a_n$ forming the block, and "*" denotes the complex conjugate operator. The encoding matrix $F_{ALA}$ includes two rows and two columns. Each column corresponds to a transmitting antenna Ta(1), Ta(2), while each row corresponds to a particular time slot Ts(1), Ts(2). During the time slot Ts(1), the symbol $a_1$ is transmitted by the transmitting antenna Ta(1), and the symbol $a_2$ is transmitted by the transmitting antenna Ta(2). During the following time slot Ts(2), the transmitting antenna Ta(1) transmits the symbol $-a_2$ (i.e., the opposite of the complex conjugate of the symbol $a_2$), and the transmitting antenna Ta(2) transmits the symbol $a_1^*$ (i.e., the complex conjugate of the symbol $a_1$).

According to a second transmission diversity scheme implemented by the space-time encoder block 120, hereinafter referred to as "ABBA scheme", the data is transmitted by means of four transmitting antennas. According to this scheme, the symbols of the data stream $a_n$ are subdivided in blocks formed by four consecutive symbols in the stream. Then, each block is encoded into a 4×4 code using the following encoding matrix:

$$F_{ABBA}(a_1, a_2, a_3, a_4) = \begin{pmatrix} a_1 & a_2 & a_3 & a_4 \\ -a_2^* & a_1^* & -a_4^* & a_3^* \\ a_3 & a_4 & a_1 & a_2 \\ -a_4^* & a_3^* & -a_2^* & a_1^* \end{pmatrix} \quad (2)$$

$$= \begin{pmatrix} F_{ALA}(a_1, a_2) & F_{ALA}(a_3, a_4) \\ F_{ALA}(a_2, a_3) & F_{ALA}(a_0, a_1) \end{pmatrix}$$

wherein $a_1, a_2, a_3, a_4$ are the four consecutive symbols of the data stream $a_n$ forming the block. The encoding matrix $F_{ABBA}$ includes four rows and four columns. Consequently, the encoded symbols are transmitted in four time slots Ts(1), Ts(2), Ts(3), Ts(4) by the four transmitting antennas Ta(1), Ta(2), Ta(3), Ta(4). It has to be noted that the encoding matrix $F_{ABBA}$ is formed by four 2×2 sub-matrixes: the two sub-matrixes located on the main diagonal are encoding matrixes $F_{ALA}$ of the Alamouti scheme corresponding to the symbols $a_1, a_2$, while the other two sub-matrixes are encoding matrixes $F_{ALA}$ of the Alamouti scheme corresponding to the symbols $a_3, a_4$.

The space-time encoder block 120 is connected to a transmitter apparatus 125, which is coupled to four transmitting antennas 130. In case the transmission diversity scheme adopted by the space-time encoder 120 is the ABBA scheme, the transmitter apparatus 125 drives all the four transmitting antennas 130, according to the code generated by the space-time encoder block 120. In case instead the transmission diversity scheme adopted by the space-time encoder 120 is the Alamouti scheme, the transmitter apparatus 125 drives only two of the four transmitting antennas 130, for example keeping off the remaining ones.

In operation, assuming use of the ABBA scheme, a block of four symbols $a_1, a_2, a_3, a_4$ of the data stream $a_n$ is encoded by the space-time encoder block 120 according to the encoding matrix $F_{ABBA}$. Then, the elements of the encoding matrix $F_{ABBA}$ are subjected to spreading and scrambling processes that depend on the particular CDMA modulation scheme adopted by the wireless telecommunication system 100. The resulting encoding matrix, referred to as modified encoding matrix $A_{ABBA}$, is then provided to the transmitter apparatus 125, that accordingly drives all the four transmitting antennas 130 for the transmission of the encoding matrix elements on a so-called Multi Input Multi Output (MIMO) transmission channel.

Similar considerations apply in case the Alamouti scheme is adopted, with the difference that only two antennas 130 are exploited (in this case, the resulting modified encoding matrix is referred to as $A_{ALA}$).

Considering a simplified MIMO channel with a single path flat fading channel for each transmitting antenna, it is possible to describe the features of the channel by means of a channel vector $X_C$, wherein:

$$X_C = \begin{bmatrix} x_0 \\ \vdots \\ x_{n-1} \end{bmatrix}. \quad (3)$$

The channel vector $X_C$ is formed by a plurality of channel coefficients $x_0, \ldots, x_{n-1}$ (n=2 in case the Alamouti scheme is adopted, and n=4 in case the ABBA scheme is adopted), wherein each channel coefficient characterizes the transmission channel on which the data transmitted by a corresponding transmitting antenna is conveyed.

In response to the transmission, the receiver side 110 retrieves a corresponding received vector R, which elements $r_1, \ldots, r_n$, referred to as "received symbols", which depend on the transmitted symbols in the following way:

$$R = \begin{bmatrix} r_1 \\ \vdots \\ r_n \end{bmatrix} = A_c^T \begin{bmatrix} x_0 \\ \vdots \\ x_{n-1} \end{bmatrix} + v, \quad (4)$$

wherein $A_c^T$ is the transposed modified encoding matrix (i.e., the transposed of the modified encoding matrix $A_{ABBA}$ or $A_{ALA}$, depending on the transmission diversity scheme adopted) and $v$ is a vector representing the effects of the Additive White Gaussian Noise (AWGN) on the transmission.

More particularly, on the receiver side 110, the received symbols $r_1, \ldots, r_n$ are picked up by a receiving antenna 135, which is coupled to a receiver apparatus 140. The received symbols $r_1, \ldots, r_n$ depend on the spreading and scrambling processes performed on the transmitter side 105. As a consequence, in order to retrieve the symbols of the data stream $a_n$ that has been transmitted, the symbols of the received vector R are subjected to processes directed to remove the effects of both the spreading and the scrambling. For this purpose, the received vector R is provided to a demodulator circuit 145, which is adapted to generate a corresponding demodulated vector Y:

$$Y = \begin{bmatrix} y_1 \\ \vdots \\ y_n \end{bmatrix}, \quad (5)$$

formed by demodulated symbols $y_1, \ldots, y_n$ that are versions of the received symbols $r1, \ldots, r_n$ which depend no more on the spreading and scrambling processes used on the transmission side.

As known in the art, it is possible to express the demodulated vector Y as a function of the channel and of the symbols of the data stream $a_n$ that has been transmitted in the following way:

$$Y = \begin{bmatrix} y_1 \\ \vdots \\ y_n \end{bmatrix} = XS + v = X \begin{bmatrix} a_1 \\ \vdots \\ a_n \end{bmatrix} + v. \quad (6)$$

More particularly, the equation (6) shows that, neglecting the AWGN $v$, the demodulated vector Y is equal to a symbol vector S, formed by the symbols of the data stream $a_n$ that have been transmitted, multiplied by a so-called "channel matrix" X. The channel matrix X derives from the encoding matrix exploited for the transmission (i.e., the encoding matrix $F_{ALA}$ or $F_{ABBA}$), and is obtained using the channel coefficients $x_0, \ldots, x_{n-1}$ of channel vector $X_C$ as elements thereof. More particularly, the channel matrix X of a transmission performed using the Alamouti scheme is:

$$X = \begin{pmatrix} x_0 & x_1 \\ -x_1^* & x_0^* \end{pmatrix}, \quad (7)$$

while the channel matrix X of a transmission performed using the ABBA scheme is:

$$X = \begin{pmatrix} x_0 & x_1 & x_2 & x_3 \\ -x_1^* & x_0^* & -x_3^* & x_2^* \\ x_2 & x_3 & x_0 & x_1 \\ -x_3^* & x_2^* & -x_1^* & x_0^* \end{pmatrix} \qquad (8)$$

Thus, the channel matrix X takes into account both the transmission diversity scheme adopted for the transmission and the channel coefficients $x_0, \ldots, x_{n-1}$ that characterize the channel. The channel matrix X is determined, on the receiver side 110, by a channel estimator circuit block 150 that, performing operations on the received vector R provided by the receiver apparatus 140, generates esteems of the channel coefficients $x_0, \ldots, x_{n-1}$.

In order to retrieve the symbols of the data stream $a_n$ transmitted on the transmitter side 105, the demodulated vector Y and the channel matrix X are provided to a decoder apparatus 155, which, according to the equation (6), outputs the symbol vector S.

The Applicant has observed that with the equation (6) it is possible to obtain the highest diversity gain provided that:

$$X^H X = I, \qquad (9)$$

wherein the apex H is the Hermitian operator and I is the identity matrix.

However, in the case where the ABBA scheme is adopted, $$X^H X = \begin{bmatrix} a & 0 & b & 0 \\ 0 & a & 0 & b \\ b & 0 & a & 0 \\ 0 & b & 0 & a \end{bmatrix}, \qquad (10)$$

wherein:

$$b = 2Re[x_0 x_2^* + x_1 x_3^*] \qquad (11)$$

and:

$$a = \Sigma |x_i|^2. \qquad (12)$$

Thus, observing equation (10), it can be appreciated that, in general, it is not possible to reach the highest diversity gain adopting the ABBA scheme, since the matrix (10) is not the identity matrix. As a consequence, in the decoding process of the demodulated symbols $y_1, \ldots, y_n$, the decoder apparatus 155 has to generate and make use of a decorrelation matrix D such that:

$$DX^H X = I. \qquad (13)$$

From the equations (10) and (13) it can be shown that the decorrelation matrix D is equal to:

$$D = (X^H X)^{-1} = \frac{1}{a} \begin{bmatrix} 1 & 0 & b & 0 \\ 0 & 1 & 0 & b \\ b & 0 & 1 & 0 \\ 0 & b & 0 & 1 \end{bmatrix}. \qquad (14)$$

Once the decorrelation matrix D has been generated (as will be described in greater detail in the following of the present description, for accomplishing this task the decoder apparatus 155 needs to be fed by the channel estimator circuit block 150 with the channel matrix X), the decoder apparatus 155 calculates a decoding matrix $D_M$ equal to:

$$D_M = DX^H. \qquad (15)$$

In this way, substituting the equations (13), (14) and (15) in the equation (6), and neglecting for the sake of simplicity the AWGN v, the symbol vector S can be retrieved using the following equation:

$$S = \begin{bmatrix} a_1 \\ \vdots \\ a_n \end{bmatrix} = D_M Y = DX^H \begin{bmatrix} y_1 \\ \vdots \\ y_n \end{bmatrix}. \qquad (16)$$

Figure 2:
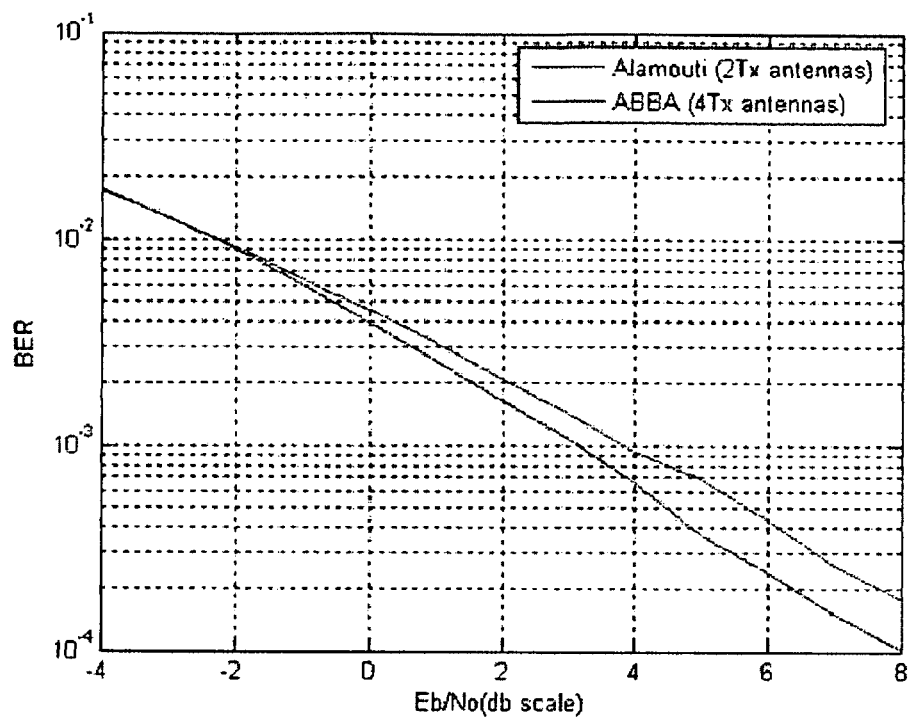
FIG. 2 shows simulation results of the performance of the wireless telecommunication system of FIG. 1 when operating with Alamouti and ABBA diversity gain schemes.

The Applicant has simulated the performance of the wireless telecommunication system 100 when operating with both the Alamouti and ABBA diversity gain schemes. The results of this simulation are illustrated in FIG. 2, wherein the horizontal axis indicates the Signal to Noise Ratio (SNR) of the transmission, and the vertical axis the Bit Error Ratio (BER) thereof. The wireless telecommunication system 100 has been simulated with a simplified channel model, of the slow Rayleigh Fading type. Moreover, the simulations have been carried out assuming that the channel estimates performed by the channel estimator circuit block 150 are ideal, i.e., it is assumed that the channel coefficients $x_0, \ldots, x_{n-1}$ retrieved by the channel estimator circuit block 150 actually reflect the real features of the channels.

From the results of the simulation, it can be noted that for low values of SNR the performance offered by the wireless telecommunication system 100 are essentially the same irrespective of whether the Alamouti scheme or the ABBA scheme is adopted. For higher SNR values, adopting the ABBA scheme allows obtaining a BER lower than 3 dB with respect the obtainable adopting the Alamouti scheme. However, this result strictly depends on the simplified channel model that has been exploited for the simulation. Indeed, adopting a MIMO channel model different than that used for the simulation, it may be possible to have better performance by adopting the Alamouti scheme instead of the ABBA one. This may occur in case the channel estimates made by the channel estimator circuit block 150 is not very precise. More particularly, even if the value of the channel coefficients $x_0, \ldots, x_{n-1}$ estimated by the channel estimator circuit block 150 are different from the real ones by a small amount, the performance is strongly lowered (in case of adopting the ABBA scheme) by the fact of having to use the decorrelation matrix D. Indeed, as can be observed by the equation (14), the decorrelation matrix D is generated through a matrix inversion operation, that amplifies the error of the estimates. As a consequence, in order to maintain the performance of the wireless telecommunication system 100 at an acceptable level in all the conditions, the decoder apparatus 155 has to be capable of performing decoding operations on the symbols of the demodulated vector Y selecting one diversity scheme from between the Alamouti and ABBA schemes as a function of the channel estimates.

In the following description, the operations performed by the decoder apparatus 155 according to an embodiment of the present invention will be described in greater detail, for retrieving the symbol vector S from the demodulated vector Y.

By rearranging the decorrelation matrix D into a closed form, it is possible to express it in the following way:

$$D = \frac{1}{a} \begin{bmatrix} 1 & 0 & b & 0 \\ 0 & 1 & 0 & b \\ b & 0 & 1 & 0 \\ 0 & b & 0 & 1 \end{bmatrix} = \frac{1}{a} \begin{bmatrix} I & E \\ E & I \end{bmatrix}, \qquad (17)$$

wherein I is the 2×2 identity matrix and:

$$E = \begin{bmatrix} b & 0 \\ 0 & b \end{bmatrix} = b \begin{bmatrix} 1 & 0 \\ 0 & 1 \end{bmatrix}. \tag{18}$$

Moreover, by defining the following two 2×2 matrixes A and B:

$$A = \begin{pmatrix} x_0 & x_1 \\ -x_1^* & x_0^* \end{pmatrix} \quad B = \begin{pmatrix} x_2 & x_3 \\ -x_3^* & x_2^* \end{pmatrix}, \tag{19}$$

it is possible to express the channel matrix X (of a transmission exploiting the ABBA scheme) in the following way:

$$X = \begin{bmatrix} A & B \\ B & A \end{bmatrix}. \tag{20}$$

In the same way, the Hermitian of the channel matrix X can be expressed as:

$$X^H = \begin{bmatrix} A^H & B^H \\ B^H & A^H \end{bmatrix}. \tag{21}$$

Therefore, the decoding matrix $D_M$ can be expressed in the following way:

$$\begin{aligned} DH^H &= \frac{1}{a} \begin{bmatrix} I & E \\ E & I \end{bmatrix} \begin{bmatrix} A^H & B^H \\ B^H & A^H \end{bmatrix} \\ &= \frac{1}{a} \begin{bmatrix} A^H + EB^H & B^H + EA^H \\ B^H + EA^H & A^H + EB^H \end{bmatrix} \\ &= \frac{1}{a} \left( \begin{bmatrix} A^H & B^H \\ B^H & A^H \end{bmatrix} + b \begin{bmatrix} I & 0 \\ 0 & I \end{bmatrix} \begin{bmatrix} B^H & A^H \\ A^H & B^H \end{bmatrix} \right) \\ &= \frac{1}{a} \left( \begin{bmatrix} A^H & B^H \\ B^H & A^H \end{bmatrix} + b \begin{bmatrix} B^H & A^H \\ A^H & B^H \end{bmatrix} \right). \end{aligned} \tag{22}$$

Using equation (22) in the equation (16), and considering n=4 (i.e., using the ABBA scheme) the symbol vector S can be expressed as:

$$\begin{aligned} S = DH^H \begin{bmatrix} y_1 \\ y_2 \\ y_3 \\ y_4 \end{bmatrix} &= \frac{1}{a} \left( \begin{bmatrix} A^H & B^H \\ B^H & A^H \end{bmatrix} + b \begin{bmatrix} B^H & A^H \\ A^H & B^H \end{bmatrix} \right) \begin{bmatrix} y_1 \\ y_2 \\ y_3 \\ y_4 \end{bmatrix} = \\ &= \frac{1}{a} \left( \begin{bmatrix} A^H & B^H \\ B^H & A^H \end{bmatrix} \begin{bmatrix} y_1 \\ y_2 \\ y_3 \\ y_4 \end{bmatrix} + b \begin{bmatrix} B^H & A^H \\ B^H & A^H \end{bmatrix} \begin{bmatrix} y_3 \\ y_4 \\ y_1 \\ y_2 \end{bmatrix} \right) = \\ &= \frac{1}{a} \left( \begin{bmatrix} A^H \begin{bmatrix} y_1 \\ y_2 \end{bmatrix} + B^H \begin{bmatrix} y_3 \\ y_4 \end{bmatrix} \\ B^H \begin{bmatrix} y_1 \\ y_2 \end{bmatrix} + A^H \begin{bmatrix} y_3 \\ y_4 \end{bmatrix} \end{bmatrix} + b \begin{bmatrix} A^H \begin{bmatrix} y_3 \\ y_4 \end{bmatrix} + B^H \begin{bmatrix} y_1 \\ y_2 \end{bmatrix} \\ B^H \begin{bmatrix} y_3 \\ y_4 \end{bmatrix} + A^H \begin{bmatrix} y_1 \\ y_2 \end{bmatrix} \end{bmatrix} \right). \end{aligned} \tag{23}$$

Defining two vectors $YR_H$, $YL_H$ in the following way:

$$YR_H = \begin{bmatrix} A^H \begin{bmatrix} y_1 \\ y_2 \end{bmatrix} + B^H \begin{bmatrix} y_3 \\ y_4 \end{bmatrix} \\ B^H \begin{bmatrix} y_1 \\ y_2 \end{bmatrix} + A^H \begin{bmatrix} y_3 \\ y_4 \end{bmatrix} \end{bmatrix} = \begin{bmatrix} yr_1 \\ yr_2 \\ yr_3 \\ yr_4 \end{bmatrix} \tag{24}$$

$$YL_H = \begin{bmatrix} A^H \begin{bmatrix} y_3 \\ y_4 \end{bmatrix} + B^H \begin{bmatrix} y_1 \\ y_2 \end{bmatrix} \\ B^H \begin{bmatrix} y_3 \\ y_4 \end{bmatrix} + A^H \begin{bmatrix} y_1 \\ y_2 \end{bmatrix} \end{bmatrix} = \begin{bmatrix} yl_1 \\ yl_2 \\ yl_3 \\ yl_4 \end{bmatrix},$$

the symbol vector S can be also expressed as:

$$S = DH^H \begin{bmatrix} y_1 \\ y_2 \\ y_3 \\ y_4 \end{bmatrix} = \frac{1}{a}(YR_H + bYL_H) = \frac{1}{a} \left( \begin{bmatrix} yr_1 \\ yr_2 \\ yr_3 \\ yr_4 \end{bmatrix} + b \begin{bmatrix} yl_3 \\ yl_4 \\ yl_1 \\ yl_2 \end{bmatrix} \right). \tag{25}$$

The decoder apparatus 155 according to an embodiment of the present invention is adapted to generate the symbol vector S starting from the channel coefficients $x_0, \ldots, x_{n-1}$ provided by the channel estimator circuit block 150 and from the demodulated symbols $y_1, \ldots, y_n$ provided by the demodulator circuit 145, based on the equations (24) and (25). More particularly, referring to the equation (24), the decoder apparatus 155 is adapted to calculate the vectors $YR_H$, $YL_H$ in an incremental way, through the repetition of a basic operation directed to the generation of partial vectors PVi (i=1 to 4):

$$PVi = \begin{bmatrix} f_i \\ g_i \end{bmatrix} = \{A^H, B^H\} \times \left\{ \begin{bmatrix} y_1 \\ y_2 \end{bmatrix}, \begin{bmatrix} y_3 \\ y_4 \end{bmatrix} \right\}; \tag{26}$$

these partial vectors, summed with each other, form the vectors $YR_H$, $YL_H$, as will be described in the following description.

In more detail, the operations performed by the decoder apparatus 155 are handled according to an algorithm, hereinafter referred to as "constant geometry algorithm", which includes four main computational steps. Each step of the constant geometry algorithm is directed to the generation of a corresponding partial vector PVi, and is defined in the following way:

1) load[$A^H$]-load[$y_1,y_2$]
2) load[$B^H$]-keep[$y_1,y_2$]
3) keep[$B^H$]-load[$y_3,y_4$]
4) load[$A^H$]-keep[$y_3,y_4$]

In a first step, the decoder apparatus 155 takes the channel coefficients $x_0$, $x_1$ forming the matrix $A^H$, and the two first demodulated symbols of the demodulated vector Y, i.e., the demodulated symbols $y_1,y_2$.

Then, the decoder apparatus 155 generates the first partial vector PV1 exploiting the channel coefficients $x_0$, $x_1$, and the demodulated symbols $y_1 y_2$ in the following way:

$$PV1 = \begin{bmatrix} f_1 \\ g_1 \end{bmatrix} = A^H \begin{bmatrix} y_1 \\ y_2 \end{bmatrix} = \begin{bmatrix} x_0^* & x_1 \\ x_1^* & -x_0 \end{bmatrix} \begin{bmatrix} y_1 \\ y_2 \end{bmatrix}. \tag{27}$$

At this point, based on the assumption that at the beginning of the algorithm the vectors $YR_H, YL_H$ are initialized in such a way that all their elements are set to "0" values, the vectors $YR_H, YL_H$ are updated with the elements of the first partial vector PV1:

$$\begin{bmatrix} yr_1 \\ yr_2 \\ yr_3 \\ yr_4 \end{bmatrix} = \begin{bmatrix} f_1 \\ g_1 \\ 0 \\ 0 \end{bmatrix}, \begin{bmatrix} yl_1 \\ yl_2 \\ yl_3 \\ yl_4 \end{bmatrix} = \begin{bmatrix} f_1 \\ g_1 \\ 0 \\ 0 \end{bmatrix}. \quad (28)$$

In a second step, the decoder apparatus 155 takes the channel coefficients $x_2, x_3$ forming the matrix $B^H$, keeping the demodulated symbols $y_1 y_2$ that have been taken in the first step.

Then, the decoder apparatus 155 generates the second partial vector PV2 exploiting the channel coefficients $x_2, x_3$ and the demodulated symbols $y_1, y_2$:

$$PV2 = \begin{bmatrix} f_2 \\ g_2 \end{bmatrix} = B^H \begin{bmatrix} y_1 \\ y_2 \end{bmatrix} = \begin{bmatrix} x_2^* & x_3 \\ x_3^* & -x_2 \end{bmatrix} \begin{bmatrix} y_1 \\ y_2 \end{bmatrix}. \quad (29)$$

The vectors $YR_H, YL_H$ are then updated with the elements of the second partial vector PV2:

$$\begin{bmatrix} yr_1 \\ yr_2 \\ yr_3 \\ yr_4 \end{bmatrix} = \begin{bmatrix} f_1 \\ g_1 \\ f_2 \\ g_2 \end{bmatrix}, \begin{bmatrix} yl_1 \\ yl_2 \\ yl_3 \\ yl_4 \end{bmatrix} = \begin{bmatrix} f_1 \\ g_1 \\ f_2 \\ g_2 \end{bmatrix}. \quad (30)$$

In a third step, the decoder apparatus 155 takes the two last demodulated symbols of the demodulated vector Y, i.e., the demodulated symbols $y_3, y_4$, keeping the channel coefficients $x_2, x_3$ that have been taken in the previous step.

Then, the decoder apparatus 155 generates the third partial vector PV3 exploiting the channel coefficients $x_2, x_3$ and the demodulated symbols $y_3, y_4$:

$$PV3 = \begin{bmatrix} f_2 \\ g_2 \end{bmatrix} = B^H \begin{bmatrix} y_3 \\ y_4 \end{bmatrix} = \begin{bmatrix} x_2^* & x_3 \\ x_3^* & -x_2 \end{bmatrix} \begin{bmatrix} y_3 \\ y_4 \end{bmatrix}. \quad (31)$$

The vectors $YR_H, YL_H$ are then updated with the elements of the third partial vector PV3:

$$\begin{bmatrix} yr_1 \\ yr_2 \\ yr_3 \\ yr_4 \end{bmatrix} = \begin{bmatrix} f_1 + f_3 \\ g_1 + g_3 \\ f_2 \\ g_2 \end{bmatrix}, \begin{bmatrix} yl_1 \\ yl_2 \\ yl_3 \\ yl_4 \end{bmatrix} = \begin{bmatrix} f_1 + f_3 \\ g_1 + g_3 \\ f_2 \\ g_2 \end{bmatrix}. \quad (32)$$

In a fourth step, the decoder apparatus 155 takes the channel coefficients $x_0, x_1$, keeping the demodulated symbols $y_3, y_4$ that have been taken in the previous step.

Then, the decoder apparatus 155 generates the fourth partial vector PV4 exploiting the channel coefficients $x_0, x_1$ and the demodulated symbols $y_3, y_4$:

$$PV4 = \begin{bmatrix} f_2 \\ g_2 \end{bmatrix} = A^H \begin{bmatrix} y_3 \\ y_4 \end{bmatrix} = \begin{bmatrix} x_0^* & x_1 \\ x_1^* & -x_0 \end{bmatrix} \begin{bmatrix} y_3 \\ y_4 \end{bmatrix} \quad (33)$$

The vectors $YR_H, YL_H$ are then updated with the elements of the fourth partial vector PV4:

$$\begin{bmatrix} yr_1 \\ yr_2 \\ yr_3 \\ yr_4 \end{bmatrix} = \begin{bmatrix} f_1 + f_3 \\ g_1 + g_3 \\ f_2 + f_4 \\ g_2 + g_4 \end{bmatrix}, \begin{bmatrix} yl_1 \\ yl_2 \\ yl_3 \\ yl_4 \end{bmatrix} = \begin{bmatrix} f_1 + f_3 \\ g_1 + g_3 \\ f_2 + f_4 \\ g_2 + g_4 \end{bmatrix}. \quad (34)$$

Once the fourth step has been completed, the vectors $YR_H, YL_H$ are combined to each other according the equation (25), in such a way to obtain the symbol vector S:

$$S = DH^H \begin{bmatrix} y_1 \\ y_2 \\ y_3 \\ y_4 \end{bmatrix} = \frac{1}{a} \left( \begin{bmatrix} yr_1 \\ yr_2 \\ yr_3 \\ yr_4 \end{bmatrix} + b \begin{bmatrix} yl_3 \\ yl_4 \\ yl_1 \\ yl_2 \end{bmatrix} \right) = \frac{1}{a} \left( \begin{bmatrix} f_1 + f_3 \\ g_1 + g_3 \\ f_2 + f_4 \\ g_2 + g_4 \end{bmatrix} + b \begin{bmatrix} f_2 + f_4 \\ g_2 + g_4 \\ f_1 + f_3 \\ g_1 + g_3 \end{bmatrix} \right). \quad (35)$$

Up to now it has been assumed that the transmission has been performed adopting the ABBA scheme, according to which blocks of four symbols are transmitted through four transmitting antennas. Expediently, the constant geometry algorithm described in the above can be exploited in a reduced version thereof by the decoder apparatus 155 when the transmission is performed adopting the Alamouti scheme.

More particularly, in the latter case it is sufficient to perform only the first step of the constant geometry algorithm described above (i.e., the step load[$A^H$]-load[$y_1,y_2$]), and directly consider the first partial vector PV1 as a result of the decoding operations. Indeed, as can be shown referring to equation (27), the operations performed, for calculating the first partial vector PV1 may be also interpreted as if directed to the decoding of a two-symbols vector encoded according to the Alamouti scheme, with the demodulated vector Y that includes the demodulated symbols $y_1, y_2$ only and the symbol vector S that coincides with the first partial vector PV1.

Figure 3:
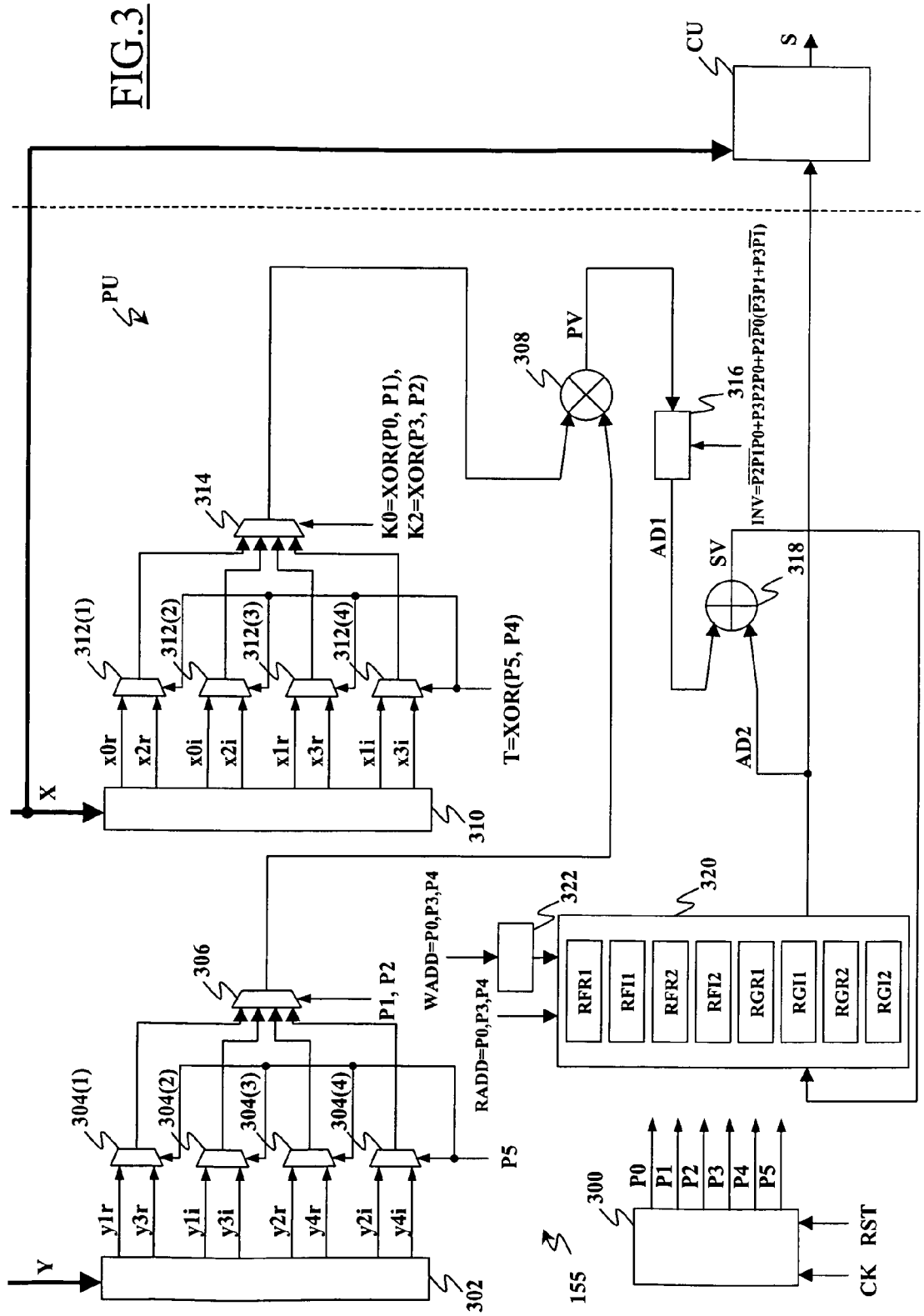
FIG. 3 schematically shows in terms of functional blocks the main functional components of a decoder apparatus used on a receiver side of the wireless telecommunication system of FIG. 1, according to an embodiment of the present invention.

FIG. 3 schematically shows, in terms of functional blocks, the main functional components of the decoder apparatus 155 according to an embodiment of the present invention, adapted to implement the constant geometry algorithm described in the foregoing.

The decoder apparatus 155 includes two main sections. A first section, referred to as processing unit PU, has the purpose of performing operations implementing the four steps of the algorithm previously described, for generating the vectors $YR_H, YL_H$; a second section, referred to as combining unit CU, has the purpose of combining the vectors $YR_H, YL_H$ generated by the processing unit PU for obtaining the symbol vector S.

The processing unit PU includes a 6-bit counter 300, adapted to generate an ordered 6-bit binary sequence that is exploited by the other circuit blocks of the processing unit PU for the timing of their operations, as will be described in the following description. More particularly, the counter 300 receives as inputs a clock signal CK and a reset signal RST, and provides as outputs six counter bits P0, P1, P2, P3, P4, P5. When the reset signal RST is asserted, for example, to start the sequence, the counter bits P0, P1, P2, P3, P4, P5 are all set to the "0" value. Then, at each clock period, the counter bits are updated in such a way to generate the binary sequence (000000, 000001, 000010, ..., 111111).

The processing unit PU includes a first register 302 that is adapted to receive from the demodulator circuit 145 a numeric string identifying the demodulated vector Y and to temporarily store it. More in particular, making explicit the real and the imaginary parts of each one of the four demodulated symbols $y_1, \ldots, y_4$, the demodulated vector Y is represented by a numeric string that includes eight demodulated values y1r, y2r, y3r, y4r, y1i, y2i, y3i, y4i. The first four demodulated values correspond to the real parts of the demodulated symbols $y_1, y_2, y_3, y_4$, respectively, and the last four demodulated values correspond to the imaginary parts thereof.

According to an embodiment of the present invention, each demodulated value y1r, y2r, y3r, y4r, y1i, y2i, y3i, y4i is represented by a 32-bit string, one bit of which indicates the sign (positive or negative) of the value. Naturally, nothing prevents representing the demodulated values y1r, y2r, y3r, y4r, y1r, y2i, y3i, y4i in other ways, for example, with strings including a different number of bits.

The first register 302 further includes eight outputs for providing the demodulated values y1r, y2r, y3r, y4r, y1i, y2i, y3i, y4i to four two-input multiplexers 304(i) (i=1 to 4). More particularly, the multiplexer 304(1) has a first input for receiving the demodulated value y1r and a second input for receiving the demodulated value y3r, the multiplexer 304(2) has a first input for receiving the demodulated value y1i and a second input for receiving the demodulated value y3i; the multiplexer 304(3) has a first input for receiving the demodulated value y2r and a second input for receiving the demodulated value y4r; the multiplexer 304(4) has a first input for receiving the demodulated value y2i and a second input for receiving the demodulated value y4i. All the four multiplexers 304(i) have a control terminal receiving the counter bit P5 and an output terminal for providing one of the two demodulated values fed at their inputs to a corresponding input of a four-input multiplexer 306 according to the counter bit P5 value.

The multiplexer 306 further includes a control terminal for receiving the counter bits P1, P2 and an output terminal for providing one of the four demodulated values fed at its inputs to an input of a multiplier circuit 308 (for example, a 32-bit multiplier circuit) according to the values assumed by the counter bits P1, P2.

The processing unit PU further includes a second register 310 that is adapted to receive from the channel estimator circuit block 150 a numeric string identifying the four channel coefficients $x_0, \ldots, x_3$ and to temporarily store them. More in particular, the numeric string includes eight channel values x0r, x1r, x2r, x3r, x0i, x1i, x2i, x3i. The first four channel values correspond to the real parts of the channel coefficients $x_0, x_1, x_2, x_3$, respectively, and the last four channel values correspond to the imaginary parts thereof.

In the same way as for the demodulated values y1r, y2r, y3r, y4r, y1i, y2i, y3i, y4i, according to an embodiment of the present invention, each channel value x0r, x1r, x2r, x3r, x0i, x1i, x2i, x3i is represented with a 32-bit string, one bit of which indicates the sign (positive or negative) of the value.

The second register 310 further includes eight outputs for providing the channel values x0r, x1r, x2r, x3r, x0i, x1i, x2i, x3i to four two-input multiplexers 312(i) (i=1 to 4). More particularly, the multiplexer 312(1) has a first input for receiving the channel value x0r and a second input for receiving the channel value x2r, the multiplexer 312(2) has a first input for receiving the channel value x0i and a second input for receiving the channel value x2i. The multiplexer 312(3) has a first input for receiving the channel value x1r and a second input for receiving the channel value x3r. The multiplexer 312(4) has a first input for receiving the channel value x1i and a second input for receiving the channel value x3i. All the four multiplexers 312(i) have a control terminal receiving a logic signal T whose value is given by the result of a XOR operation between the counter bit P5 and the counter bit P4, and an output terminal for providing one of the two channel values fed at their inputs to a corresponding input of a four-input multiplexer 314 according to the value of the signal T.

The multiplexer 314 includes a control terminal for receiving two signals K0, K1. The signal K0 is the result of a XOR operation between the counter bit P0 and the counter bit P1. The signal K1 is the result of a XOR operation between the counter bit P3 and P2. The multiplexer 314 further includes an output terminal for providing one of the four channel values fed at its inputs to a further input of the multiplier circuit 308 according to the values assumed by the signals K0 and K1.

The multiplier circuit 308 is adapted to receive one demodulated value selected by the multiplexers 304(i), 306 and one channel value selected by the multiplexers 312(i), 314, for accordingly calculating a 32-bit product value PV equal to the selected demodulated value multiplied with the selected channel value and providing it to an input terminal of a sign inverter circuit 316.

The sign inverter circuit 316 is adapted to selectively change the sign of the product value PV according to the value assumed by an inversion signal INV whose value depends on the counter bits P0, ... P5, as will be described in detail in the following of the description. The sign inverter circuit includes an output for providing a first addend value AD1, whose absolute value is equal to that of the product value PV and whose sign depend on the value assumed by the inversion signal INV. The first addend value AD1 is provided to a first input of an adder circuit 318.

The adder circuit 318 has a second input for receiving a second addend value AD2 from a registers battery 320, and an output for accordingly providing a sum value SV equal to the first addend value AD1 summed with the second addend value AD2.

The register battery 320 temporarily stores the results of the operations performed by the adder circuit 318, i.e., the elements $f_i, g_i$ of the partial vectors PVi, in such a way to keep them available for further processing. As will be described in the following, at the end of the operations performed following the constant geometry algorithm previously described, the registers battery 320 will store the values of the vectors $YR_H, YL_H$. For this purpose, the registers battery 320 includes a plurality of registers, each one identified by a corresponding address, that can be accessed both in writing and reading.

More particularly, according to an embodiment of the present invention, the registers battery 320 includes eight 32-bit registers: a register RFR1 adapted to store the real part of the values $f_1$ and $f_3$; a register RFI1 adapted to store the imaginary part of the values $f_1$ and $f_3$; a register RFR2 adapted to store the real part of the values $f_2$ and $f_4$; a register RFI2 adapted to store the imaginary part of the values $f_2$ and $f_4$; a register RGR1 adapted to store the real part of the values $g_1$ and $g_3$; a register RGI1 adapted to store the imaginary part of the values $g_1$ and $g_3$; a register RGR2 adapted to store the real part of the values $g_2$ and $g_4$; and a register RGI2 adapted to store the imaginary part of the values $g_2$ and $g_4$.

The registers battery 320 includes a read address register input adapted to receive a read address RADD for selecting the register to be accessed in reading. In the same way, the registers battery 320 includes a write address register input that is adapted to receive a write address WADD for selecting the register to be accessed in writing. According to an embodiment of the present invention, the read address RADD and the write address WADD are strings of bits formed by the counter bits P0, P3 and P4.

The registers battery 320 includes a write value input, adapted to receive the sum value SV calculated by the adder circuit 318 for storing it into a register thereof according to the write address WADD received.

The registers battery 320 further includes a read value output coupled to the second input of the adder circuit 318. According to the received read address RADD, the registers battery 320 selects a corresponding register and outputs the value stored therein on the read value output in such a way to provide the second addend value AD2 to the adder circuit 318.

According to an embodiment of the present invention, a control register 322 including two First-In First-Out (FIFO) registers is coupled to the write address register input for delaying the write address WADD with respect to the read address RADD, as will be described in the following of the description.

The read output value output of the register battery 320 is further coupled to a first input terminal of the combining unit CU for providing the values of the vectors $YR_H$, $YL_H$ generated following the four steps of the constant geometry algorithm. The combining unit CU has a second input for receiving the channel coefficients $x_0, \ldots, x_3$, and an output terminal for providing the values of the symbol vector S.

In order to explain how the processing unit PU operates during the generation of the vectors $YR_H$, $YL_H$, reference will be made to equation (27), where the first partial vector PV1 is expressed as a function of the channel coefficients $x_0$, $x_1$, and the demodulated symbols $y_1, y_2$.

As can be seen in equation (27), the first operation the processing unit PU executes consists in the computation of the first value $f_1$ of the first partial vector PV1, i.e.:

$$f_1 = x_0^* y_1 + x_1 y_2. \quad (36)$$

Expressing the demodulated symbols $y_1, y_2$ as a function of the demodulated values y1r, y2r, y1i, y2i, and expressing the channel coefficients $x_0, x_1$, by the channel values x0r, x1r, x0i, x1i, equation (36) can be rewritten in the following way:

$$f_1 = x_{0r} y_{1r} - j x_{0i} y_{1r} + x_{0i} y_{1i} + j x_{0r} y_{1i} + x_{1r} y_{2r} + j x_{1i} y_{2r} - x_{1i} y_{2i} + j x_{1r} y_{2i}, \quad (37)$$

wherein "j" is the imaginary unit.

Thus, once the demodulated values y1r, y2r, y1i, y2i and the channel values x0r, x1r, x0i, x1i have been stored in the corresponding first and second registers 302, 310, the processing unit PU performs eight multiplication operations and eight addition operations. Since the processing unit PU includes only one multiplier circuit 308 and only one adder circuit 318, said operations are performed in a sequential way. For this purpose, the multiplexers 304(i), 306, 312(i) and 314 are properly driven with the counter bits generated by the counter circuit 300 in such a way that, at each clock period of the clock signal CK, the multiplier circuit 308 receives at its inputs the correct demodulated value and the channel value.

Considering the generation of the first value $f_1$ of the first partial vector PV1, the addends forming the equation (37) are numbered according to an ordered sequence starting from 0 and ending with 7. In this way, since each addend of equation (37) corresponds to a multiplication operation to be performed by the multiplier circuit 308, it is possible to identify at each clock period which demodulated value and which channel value have to be selected. According to an embodiment of the present invention, the numbering is performed using the counter bits P0, P1 and P2: (P2,P1,P0)=(0,0,0) means that the multiplier circuit 308 needs the demodulated value y1r and the channel value x0r (first addend), (P2,P1,P0)=(0,0,1) means that the multiplier circuit 308 needs the demodulated value y1r and the channel value x0i (second addend), . . . , (P2,P1,P0)=(1,1,1) means that the multiplier circuit 308 needs the demodulated value y2i and the channel value x1r (eighth addend). In this way, the code (P2,P1,P0) can be used by the multiplexer 306 for selecting the correct demodulated values and channel values to be provided to the inputs of the multiplier circuit 308.

Referring again to equation (27), the next operation the processing unit PU executes consists in the computation of the second value $g_1$ of the first partial vector PV1, i.e.:

$$g_1 = x_1^* y_1 - x_0 y_2. \quad (38)$$

As for the case of $f_1$, by expressing the demodulated symbols $y_1$, $y_2$ as a function of the demodulated values y1r, y2r, y1i, y2i, and expressing the channel coefficients $x_0, x_1$, by the channel values x0r, x1r, x0i, x1i, equation (38) can be rewritten in the following way:

$$g_1 = x_{1r} y_{1r} - j x_{1i} y_{1r} + x_{1i} y_{1i} + j x_{1r} y_{1i} - x_{0r} y_{2r} - j x_{0i} y_{2r} + x_{0i} y_{2i} - j x_{0r} y_{2i}. \quad (39)$$

As can be seen in equation (39), also in this case the processing unit PU performs eight multiplication operations and eight addition operations. Also in this case, the addends forming the equation (39) are numbered according to an ordered sequence starting from 0 and ending with 7. In the same way as for $f_1$, said numbering is performed using the counter bits P0, P1 and P2: (P2,P1,P0)=(0,0,0) means that the multiplier circuit 308 needs the demodulated value y1r and the channel value x1r (first addend), (P2,P1,P0)=(0,0,1) means that the multiplier circuit 308 needs the demodulated value y1r and the channel value x1i (second addend), (P2,P1,P0)=(1,1,1) means that the multiplier circuit 308 needs the demodulated value y2i and the channel value x0r (eighth addend).

According to an embodiment of the present invention, since the code (P2,P1,P0) that identifies the addends of both equations (37) and (39) is the same, a further counter bit—particularly, the counter bit P3—is used for distinguishing which element of the first partial vector PV1 is under calculation between $f_1$ and $g_1$.

According to an embodiment of the present invention, additional counter bits are used for identifying which step of the constant geometry algorithm is performed by the processing unit PU. For this purpose, since the constant geometry algorithm provides for the execution of four steps, each one directed to the generation of the elements $f_i$, $g_i$ of a corresponding partial vector PVi (i=1 to 4), two counter bits are used: according to an embodiment of the invention, the counter bit P5 is used for discriminating the first two steps (i.e., those adapted to the generation of PV1 and PV2) from the second two steps (i.e., those adapted to the generation of PV3 and PV4), while the counter bit P4 is used for selecting a step among the pair of steps selected by the counter bit P5

Having defined the function of each counter bit generated by the counter circuit 300, in the following will be described how said counter bits are used for driving the multiplexers 304(i), 306, 312(i) and 314.

The following table shows the relationship among the counter bits P3, P2, P1, P0 and the demodulated values y1r, y2r, y1i, y2i, according to an embodiment of the present invention:

| P3 | P2 | P1 | P0 | Demodulated values |
|----|----|----|----|--------------------|
| 0  | 0  | 0  | 0  | y1r                |
| 0  | 0  | 0  | 1  | y1r                |
| 0  | 0  | 1  | 0  | y1i                |
| 0  | 0  | 1  | 1  | y1i                |
| 0  | 1  | 0  | 0  | y2r                |
| 0  | 1  | 0  | 1  | y2r                |
| 0  | 1  | 1  | 0  | y2i                |
| 0  | 1  | 1  | 1  | y2i                |
| 1  | 0  | 0  | 0  | y1r                |
| 1  | 0  | 0  | 1  | y1r                |
| 1  | 0  | 1  | 0  | y1i                |
| 1  | 0  | 1  | 1  | y1i                |
| 1  | 1  | 0  | 0  | y2r                |
| 1  | 1  | 0  | 1  | y2r                |
| 1  | 1  | 1  | 0  | y2i                |
| 1  | 1  | 1  | 1  | y2i                |

Looking at this table, it can be seen that the counter bit P2 discriminates the demodulated values y1r, y1i from the demodulated values y2r, y2i. The counter bit P1 has instead the function of discriminating the real parts (represented by y1r and y2r) from the imaginary parts (represented by y1i and y2i).

The following table shows instead the relationship among the counter bits P3, P2, P1, P0 and the demodulated values y3r, y4r, y3i, y4i:

| P3 | P2 | P1 | P0 | Demodulated values |
|----|----|----|----|--------------------|
| 0  | 0  | 0  | 0  | y3r                |
| 0  | 0  | 0  | 1  | y3r                |
| 0  | 0  | 1  | 0  | y3i                |
| 0  | 0  | 1  | 1  | y3i                |
| 0  | 1  | 0  | 0  | y4r                |
| 0  | 1  | 0  | 1  | y4r                |
| 0  | 1  | 1  | 0  | y4i                |
| 0  | 1  | 1  | 1  | y4i                |
| 1  | 0  | 0  | 0  | y3r                |
| 1  | 0  | 0  | 1  | y3r                |
| 1  | 0  | 1  | 0  | y3i                |
| 1  | 0  | 1  | 1  | y3i                |
| 1  | 1  | 0  | 0  | y4r                |
| 1  | 1  | 0  | 1  | y4r                |
| 1  | 1  | 1  | 0  | y4i                |
| 1  | 1  | 1  | 1  | y4i                |

As can be seen, the relationship among the counter bits P3, P2, P1, P0 and the demodulated values y3r, y4r, y3i, y4i has been chosen to be equal to that occurring among the counter bits P3, P2, P1, P0 and the demodulated values y1r, y2r, y1i, y2t: it is sufficient to substitute any occurrence of y1r, y1i with y3r, y3i and of y2r, y2i with y4r, y4i.

Since the demodulated values y1r, y1i are only exploited by the processing unit PU together with the demodulated values y2r, y2i during the first and second steps of the algorithm (see equations (27) and (29)) and the demodulated values y3r, y3i are only exploited together with the demodulated values y4r, y4i during the third and fourth steps of the algorithm (see equations (31) and (33)), according to an embodiment of the invention the multiplexers 304(i) are driven by the counter bit P5. Indeed, as previously mentioned, the counter bit P5 has the purpose of discriminating the first two steps (i.e., those adapted to the generation of PV1 and PV2, in which the demodulated values y1r, y1i, y2r, y2i are exploited) of the algorithm from the second two steps (i.e., those adapted to the generation of PV3 and PV4, in which the demodulated values y3r, y3i, y4r, y4i are exploited). Consequently, depending on the value assumed by the counter bit P5, i.e., depending on the step of the algorithm, the multiplexer 306 is fed with the demodulated values y1r, y1i, y2r, y2i (first and second steps) or y3r, y3i, y4r, y4i (third and fourth steps).

According to an embodiment of the present invention, the demodulated values provided to the inputs of the multiplexer 306 are selected and provided to the multiplier circuit 308 in succession depending on the values assumed by the counter bits P1 P2 according to the relationships previously described, for which the counter bit P2 discriminates the demodulated values y1r, y1i from the demodulated values y2r, y2i and the counter bit P1 discriminates the real parts from the imaginary parts.

Turning now to the selection of the channel values x0r, x1r, x2r, x3r, x0i, x1i, x2i, x3i by means of the multiplexers 312(i) and 314, according to an embodiment of the present invention, the relationship among the counter bits P5, P4 and the channel values to be selected is the following:

| P5 | P4 | Channel values          |
|----|----|-------------------------|
| 0  | 0  | x0r, x1r, x0i, x1i     |
| 0  | 1  | x2r, x3r, x2i, x3i     |
| 1  | 0  | x2r, x3r, x2i, x3i     |
| 1  | 1  | x0r, x1r, x0i, x1i     |

Consequently, according to an embodiment of the present invention the multiplexers 312(i) are driven by the logic signal T, whose value is given by the result of a XOR operation between the counter bit P5 and the counter bit P4. In this way, during the first and the fourth steps, the multiplexer 314 is fed with the channel values x0r, x1r, x0i, x1i, while, during the second and third steps, the multiplexer 314 is fed with the channel values x2r, x3r, x2i, x3i.

In a way similar to that used for the demodulated values, the following table shows the relationship among the counter bits P3, P2, P1, P0 and the channel values x0r, x1r, x0i, x1i, according to an embodiment of the present invention:

| P3 | P2 | P1 | P0 | channel values |
|----|----|----|----|----------------|
| 0  | 0  | 0  | 0  | x0r            |
| 0  | 0  | 0  | 1  | x0i            |
| 0  | 0  | 1  | 0  | x0i            |
| 0  | 0  | 1  | 1  | x0r            |
| 0  | 1  | 0  | 0  | x1r            |
| 0  | 1  | 0  | 1  | x1i            |
| 0  | 1  | 1  | 0  | x1i            |
| 0  | 1  | 1  | 1  | x1r            |
| 1  | 0  | 0  | 0  | x1r            |
| 1  | 0  | 0  | 1  | x1i            |
| 1  | 0  | 1  | 0  | x1i            |
| 1  | 0  | 1  | 1  | x1r            |
| 1  | 1  | 0  | 0  | x0r            |
| 1  | 1  | 0  | 1  | x0i            |
| 1  | 1  | 1  | 0  | x0i            |
| 1  | 1  | 1  | 1  | x0r            |

Consequently, following this table, it is possible to discriminate the channel values x0r, x0i from the channel values x1r, x1i by driving the multiplexer 314 with the logic signal K1, whose value is given by the XOR operation between the counter bit P3 and P2. Moreover, it is possible to discriminate the real parts (x0r, x1r) from the imaginary parts (x0i, x1i) by driving the multiplexer 314 with also the logic signal K0, whose value is given by the XOR operation between the counter bit P1 and P0.

Same considerations apply considering the relationship among the counter bits P3, P2, P1, P0 and the channel values x2r, x3r, x2i, x3i, for which the following table is defined:

| P3 | P2 | P1 | P0 | channel values |
|----|----|----|----|----------------|
| 0  | 0  | 0  | 0  | x2r            |
| 0  | 0  | 0  | 1  | x2i            |
| 0  | 0  | 1  | 0  | x2i            |
| 0  | 0  | 1  | 1  | x2r            |
| 0  | 1  | 0  | 0  | x3r            |
| 0  | 1  | 0  | 1  | x3i            |
| 0  | 1  | 1  | 0  | x3i            |
| 0  | 1  | 1  | 1  | x3r            |
| 1  | 0  | 0  | 0  | x3r            |
| 1  | 0  | 0  | 1  | x3i            |
| 1  | 0  | 1  | 0  | x3i            |
| 1  | 0  | 1  | 1  | x3r            |
| 1  | 1  | 0  | 0  | x2r            |
| 1  | 1  | 0  | 1  | x2i            |
| 1  | 1  | 1  | 0  | x2i            |
| 1  | 1  | 1  | 1  | x2r            |

By driving the multiplexers 304(i), 306, 312(i) and 314 in the way described above, at every period of the clock signal CK the multiplier circuit 308 receives at its inputs the channel values and the demodulated values that are necessary for calculating the various addends which are in turn necessary for obtaining the values $f_i$, $g_i$ of the partial vectors PVi.

More particularly, assuming starting after an initialization of the counter 300, the first eight periods of the clock signal CK are exploited by the PU for the computation of the value $f_1$ of the partial vector PV1. During the first period (P2,P1,P0)=(0,0,0) the multiplier circuit 308 receives the demodulated value y1r and the channel value x0r, and accordingly outputs a product value PV equal to the first addend of equation (37). During the second period (P2,P1,P0)=(0,0,1), and the multiplier circuit 308 receives the demodulated value y1r and the channel value x0i, and accordingly outputs a product value PV equal to the second addend of equation (37). The process continues until the eighth period is reached; in this period (P2,P1,P0)=(1,1,1), and the multiplier circuit 308 generates a product value PV equal to the last addend of equation (37). At this point, all the eight addends of equation (37) that are necessary for the computation of the value $f_1$ of the partial vector PV1 have been calculated by the multiplier circuit 308.

The operations are repeated for the computation of the value $g_1$ of the partial vector PV1, and then for the computation of the subsequent values—i.e., $f_2$, $g_2$, $f_3$, $g_3$, $f_4$, $g_4$. The addends calculated by the multiplier circuit 308 for the computation of said values are numbered using the counter bits P2, P1, P0 in the same way as for the computation of the value $f_1$, however the channel values and demodulated values provided to the inputs of the multiplier circuit 308 are correctly selected exploiting also the counter bits P5, P4 and P3, as previously described.

Referring again to the computation of the values $f_1$, $g_1$, it can be seen that some of the addends of the equations (37) and (39) have a positive sign, and some a negative one. As previously described, in order to determine the sign of the addends, the processing unit PU includes the sign inverter circuit 316, which is adapted to selectively change the sign of the product value PV according to the value assumed by the inversion signal INV.

By observing both the equations (37) and (39), and by identifying each addend with the counter bits P3, P2, P1, P0 as previously described, it is possible to express the sign of each addend depending on the counter bits P3, P2, P1, P0, as it is shown in the following table:

| P3 | P2 | P1 | P0 | sign |
|----|----|----|----|------|
| 0  | 0  | 0  | 0  | +    |
| 0  | 0  | 0  | 1  | −    |
| 0  | 0  | 1  | 0  | +    |
| 0  | 0  | 1  | 1  | +    |
| 0  | 1  | 0  | 0  | +    |
| 0  | 1  | 0  | 1  | +    |
| 0  | 1  | 1  | 0  | −    |
| 0  | 1  | 1  | 1  | +    |
| 1  | 0  | 0  | 0  | +    |
| 1  | 0  | 0  | 1  | −    |
| 1  | 0  | 1  | 0  | −    |
| 1  | 0  | 1  | 1  | +    |
| 1  | 1  | 0  | 0  | +    |
| 1  | 1  | 0  | 1  | −    |
| 1  | 1  | 1  | 0  | +    |
| 1  | 1  | 1  | 1  | −    |

Looking at the table above, it is possible to define the inversion signal INV as a function of the counter bits P3, P2, P1, P0 in the following way:

$$INV = \overline{P2}\,\overline{P1}P0 + P3P2P0 + P2\overline{P0}(\overline{P3}P1 + P3\overline{P1}), \quad (40)$$

wherein "−" is the negation symbol, and wherein it is assumed that the inversion signal INV is at the value "1" when the sign is negative.

Figure 4:
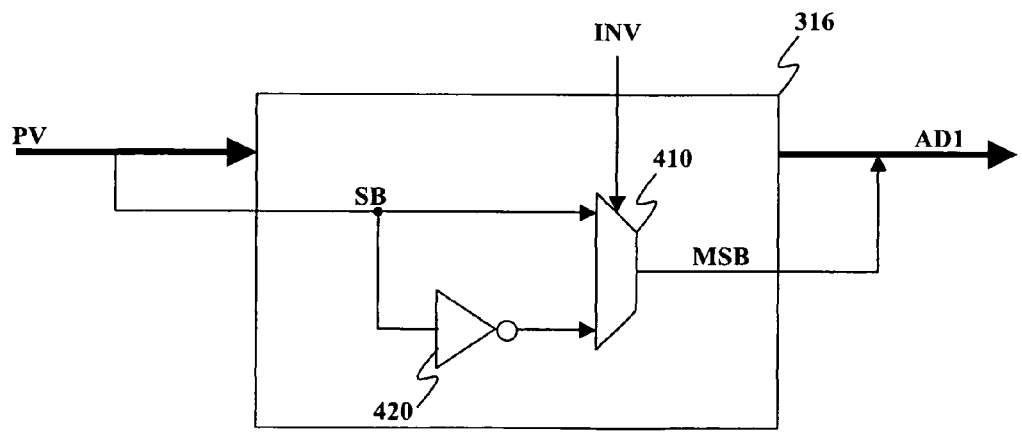
FIG. 4 illustrates the circuit structure of a sign inverter circuit included in the decoder apparatus of FIG. 3 according to an embodiment of the present invention.

FIG. 4 illustrates the circuit structure of the sign inverter circuit 316 according to an embodiment of the present invention.

The sign inverter circuit 316 includes a multiplexer 410 having a first input for receiving from the 32-bit product value PV a sign bit SB indicative of the sign thereof, and a second input connected to the output of an inverter logic gate 420, the input of which receives the sign bit SB. The multiplexer 410 further includes a control terminal adapted to receive the inversion signal INV and an output for providing a modified sign bit MSB. Depending on the value assumed by the inversion signal INV, the multiplexer 410 selects one of the two inputs. If the inversion signal INV is at the value "0", the modified sign bit MSB is equal to the sign bit SB, otherwise, in case the inversion signal INV is equal to "1", it means that the sign of the product value PV has to be changed, and the modified sign bit MSB has an opposite value with respect to that of the sign bit SB. The modified sign bit MSB is then used for defining the sign of the first addend value AD1 to be provided to the adder circuit 318.

At each period of the clock signal CK, the first addend value AD1 is provided to the first input of the adder circuit 318 for being added with the second addend value AD2 stored into one of the registers of the registers battery 320 selected according to the read address RADD (i.e., the string P4,P3, P0).

More particularly, the register providing the second addend value AD2 is selected based on which partial vector PVi and which value $f_i$, $g_i$ thereof has to be calculated according to the constant geometry algorithm.

For example, during the phase of the first step of the constant geometry algorithm in which the value $f_i$ is generated, the second addend value AD2 is provided by the registers RFR1 and RFI1 of the registers battery 320. When the first addend AD1 is a real number, the register RFR1 is selected, in such a way that the second addend value AD2 is also real. When the first addend AD1 is instead an imaginary number, the register RFI1 is selected, in such a way that the second addend value AD2 is also imaginary. In more detail, making reference to equation (37), during a first period of the clock signal CK in which the first addend AD1 is equal to $x_{0r}y_{1r}$, the second addend value AD2 is provided by the register RFR1; in the next period of the clock signal CK, in which the first addend AD1 is equal to $jx_{0i}y_{1r}$, the second addend value AD2 is provided by the register RFI1, and so on. Same considerations apply for the generation of the others values $f_i$, $g_i$.

For this purpose, the read address RADD takes values adapted to select the correct register according to which first addend value AD1 is provided to the first input of the adder circuit 318: the counter bit P3 allows to discriminate the values $f_i$ from the values $g_i$, the counter bit P4 allows to discriminate the values $f_1$ (or $f_3$) and $g_1$ (or $g_3$) from the values $f_2$ (or $f_4$) and $g_2$ (or $g_4$), and the counter bit P0 allows to discriminate the real parts from the imaginary ones.

Having received at its input both the first and the second addend values AD1, AD2, the adder circuit 318 calculates the sum thereof, providing a corresponding sum value SV to the register battery 320 for being written into the register that has been selected according to the write address WADD (i.e., the string P4,P3,P0).

According to an embodiment of the present invention, since the generation of each sum value SV requires two periods of the clock signal CK from the time the correct channel and demodulated values are selected and provided to the adder circuit 318 (i.e., one for performing the multiplication operation generating the product value PV and one for performing the addition operation generating the first addend value AD1), the write address WADD is delayed in such a way to be equal to the read address RADD of the two preceding periods of the clock signal CK. This task is accomplished by the control register 322.

At the end of the four steps of the constant geometry algorithm, the registers of the registers battery 320 store the values necessary for obtaining the vectors $YR_H$, $YL_H$: the register RFR1 stores the real part of the value $f_1$ summed with the real part of the value $f_3$, the register RIR1 stores the imaginary part of the value $f_1$ summed with the imaginary part of the value $f_3$, the register RFR2 stores the real part of the value $f_2$ summed with the real part of the value $f_4$, the register RFI1 stores the imaginary part of the value $f_2$ summed with the imaginary part of the value $f_4$, the register RGR1 stores the real part of the value $g_1$ summed with the real part of the value $g_3$, the register RGI1 stores the imaginary part of the value $g_1$ summed with the imaginary part of the value $g_3$, the register RGR2 stores the real part of the value $g_2$ summed with the real part of the value $g_4$, and the register RGI2 stores the imaginary part of the value $g_2$ summed with the imaginary part of the value $g_4$.

Then, all the values stored into the registers of the registers battery 320 are provided to the combining unit CU together with the channel coefficients $x_0, \ldots, x_{n-1}$, for the purpose of calculating the symbol vector S according to the equation (35), as will be described in the following of the present description.

Once the symbol vector S has been calculated, the registers of the registers battery 320 are reinitialized, i.e., the values stored therein are set to zero, so as to be reused for the calculation of a new symbol vector S starting from new received demodulated values.

As previously mentioned, the decoder apparatus 155 can be easily configured to decode a demodulated vector Y that has been transmitted using one among the Alamouti scheme and the ABBA scheme. In particular, in case the Alamouti scheme is adopted, the processing unit PU operates in the same way as previously described, with the difference that it is sufficient to perform only the first step of the constant geometry algorithm (i.e., the step load[$A^H$]-load[$y_1,y_2$]) for obtaining the first partial vector PV1. Indeed, as previously described, equation (27) corresponds to the decoding of a transmission performed using the Alamouti scheme. In this case, the demodulated vector Y includes the demodulated symbols $y_1$, $y_2$ only and the symbol vector S coincides with the first partial vector PV1.

In order to stop the constant geometry algorithm at the first step, the reset signal RST is asserted to reset the sequence generated by the counter circuit 300 after the values $f_1$ and $g_1$ have been calculated. Naturally, in this case only four registers of the registers battery 320 are used, and more particularly the register RFR1 for storing the real part of the value $f_1$, the register RFI1 for storing the imaginary part of the value $f_1$, the register RGR1 for storing the real part of the value $g_1$, and the register RGI1 for storing the imaginary part of the value $g_1$.

In order to describe how the combining unit CU operates according to an embodiment of the present invention, the equation (35) can be rewritten in the following expanded form:

$$S = \begin{bmatrix} \frac{1}{a}(f_1 + f_3 + b(f_2 + f_4)) \\ \frac{1}{a}(g_1 + g_3 + b(g_2 + g_4)) \\ \frac{1}{a}(f_2 + f_4 + b(f_1 + f_3)) \\ \frac{1}{a}(g_2 + g_4 + b(g_1 + g_3)) \end{bmatrix}, \quad (41)$$

wherein a and b are given by the equations (11) and (12).

As can be seen in the equation above, each element of the symbol vector S is calculated by the combining unit CU through the carrying out of sums among the values the counter 300 receives as inputs; said sums are then properly weighted by means of a and b.

Figure 5:
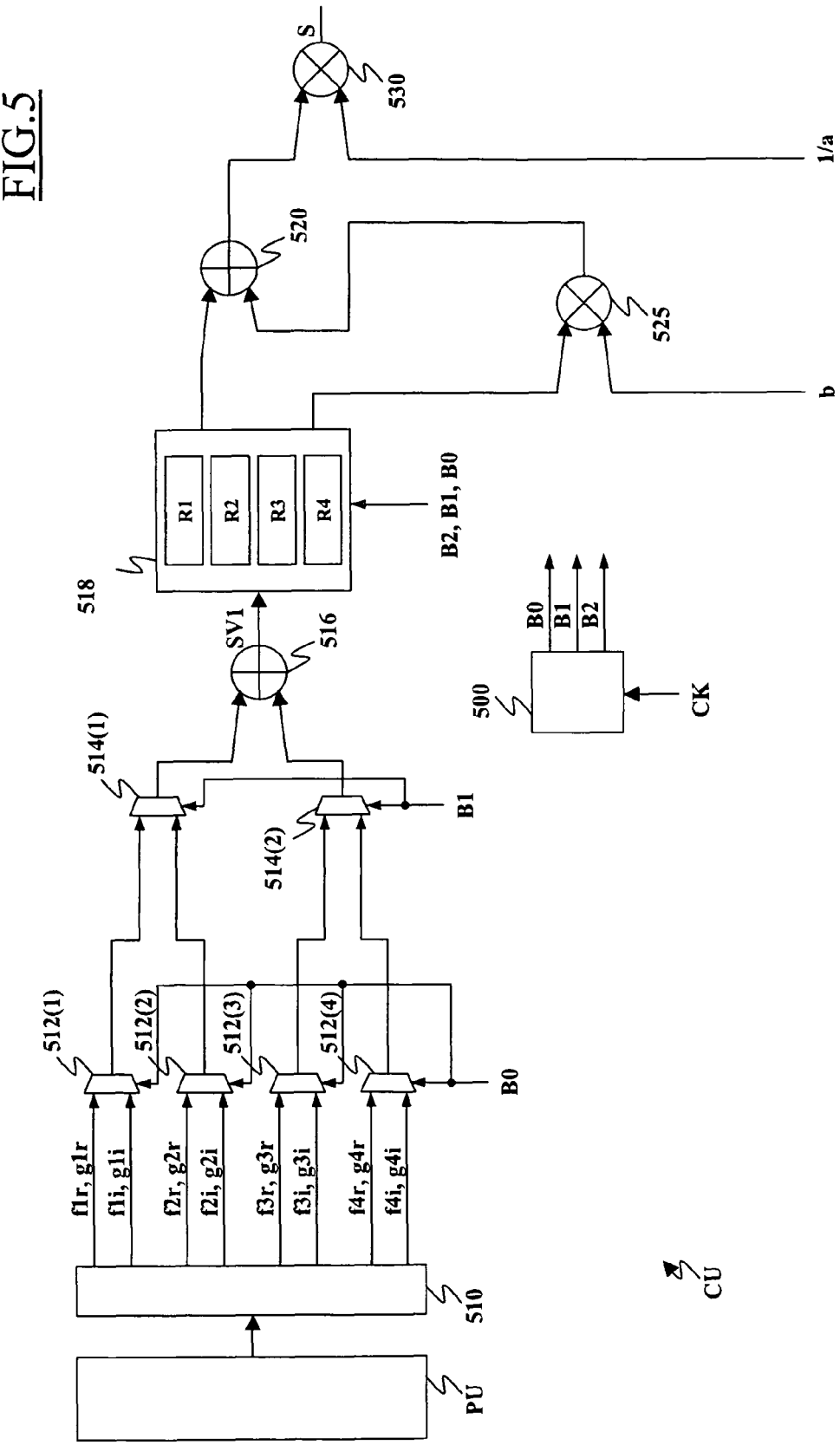
FIG. 5 schematically shows in terms of functional blocks the main functional components of a combining unit included in the decoder apparatus of FIG. 3, according to an embodiment of the present invention.

FIG. 5 schematically shows, in terms of functional blocks, the main functional components of the combining unit CU according to an embodiment of the present invention, adapted to implement the equation (41).

In a similar way as for the processing unit PU, the combining unit CU includes a counter 500 (according to an embodiment of the present invention, a 3-bit counter), adapted to generate an ordered 3-bit binary sequence that is exploited, by the other circuit blocks of the combining unit CU for the timing of their operations. For this purpose, the counter 500 receives as input the clock signal CK, and provides as outputs three counter bits B0, B1, B2. At each clock period, the counter bits are updated in such a way to generate the binary sequence (000, 001, 010, ..., 111).

The combining unit CU includes a register 510 that is adapted to receive from the processing unit PU a numeric string identifying the values $f_i$, $g_i$ and to temporarily store it.

More in particular, making explicit the real and the imaginary parts of each one of the values $f_i$, $g_i$, said numeric string includes sixteen partial values f1r, f2r, f3r, f4r, f1i, f2i, f3i, f4i, g1r, g2r, g3r, g4r, g1i, g2i, g3i, g4i: the first four partial values correspond to the real parts of the values $f_1$, $f_2$, $f_3$, $f_4$, respectively, the next four partial values correspond to the imaginary parts thereof, the still next four partial values correspond to the real parts of the values $g_1$, $g_2$, $g_3$, $g_4$, respectively, and the last four partial values correspond to the imaginary part thereof.

The register 510 further includes eight outputs for providing the partial values f1r, f2r, f3r, f4r, f1i, f2i, f3i, f4i, g1r, g2r, g3r, g4r, g1, g2i, g3i, g4i to four two-input multiplexers 512(i) (i=1 to 4). More particularly, the multiplexer 512(1) has a first input for receiving the partial values f1r, g1r and a second input for receiving the partial values f1i, g1i; the multiplexer 512(2) has a first input for receiving the partial values f2r, g2r and a second input for receiving the partial values f2i, g2i; the multiplexer 512(3) has a first input for receiving the partial values f3r, g3r and a second input for receiving the partial values f3i, g3i; the multiplexer 512(4) has a first input for receiving the partial value f4r, g4r and a second input for receiving the partial value f4i, g4i. All the four multiplexers 512(i) have a control terminal receiving the counter bit B0; the multiplexers 512(1) and 512(2) have an output terminal for providing one of the two partial values fed at their inputs to a corresponding input of a two-input multiplexer 514(1) according to the counter bit B0 value. In the same way, the multiplexers 512(3) and 512(4) have an output terminal for providing one of the two partial values fed at their inputs to a corresponding input of a two-input multiplexer 514(2) according to the counter bit B0 value.

The multiplexers 514(1), 514(2) have a control terminal receiving the counter bit B1 and an output terminal for providing one of the two partial values fed at their inputs to a corresponding input of an adder circuit 516 according to the counter bit B1 value.

The adder circuit 516 has an output for accordingly providing a sum value SV1 equal to the selected partial value provided by the multiplexer 514(1) summed with that provided by the multiplexer 514(2) to an input of a register battery 518.

In a way similar to that of the register battery 320 included in the processing unit PU, the register battery 518 stores the results of the operations performed by the adder circuit 516, in such a way to keep them available for further processing. For this purpose, the registers battery 518 includes a plurality of registers, each one identified by a corresponding address, that can be accessed both in writing and reading.

More particularly, according to an embodiment of the present invention, the registers battery 518 includes four registers: a register R1 adapted to store the value given by the value $f_1$ summed with $f_3$, a register R2 adapted to store the value given by the value $f_2$ summed with $f_4$, a register R3 adapted to store the value given by the value $g_1$ summed with $g_3$, and a register R4 adapted to store the value given by the value $g_2$ summed with $g_4$.

The registers battery 518 includes an address register input adapted to receive an address ADD for selecting the register to be accessed in reading/writing. According to an embodiment of the present invention, the address ADD is a string of bits formed by the counter bits B2, B1 and B0.

The registers battery 518 is adapted to receive the sum value SV1 calculated by the adder circuit 516 for storing it into a register thereof according to the address ADD received.

The registers battery 518 includes a first and a second outputs. According to the received address ADD, the registers battery 518 selects a corresponding register and outputs the value stored therein on a selected one between the first and the second outputs in such a way to provide the value stored thereinto.

The first output of the registers battery 318 is connected to a first input of an adder circuit 520, while the second output of the register battery 318 is connected to a first input of a multiplier circuit 525.

The multiplier circuit 525 further includes a second input adapted to receive the value b, and an output connected to a second input of the adder circuit 520 for providing thereto a value equal to the result of the multiplication between the values provided at the inputs of the multiplier circuit 525.

The adder circuit 520 further includes an output connected to a first input of a further multiplier circuit 530 for providing thereto a value equal to the sum of the values provided at the inputs of the adder circuit 520.

The multiplier circuit 530 further includes a second input adapted to receive the inverse of the value a (i.e., a value equal to 1/a), and an output for providing the result of the multiplication between the values provided at its inputs.

In a way similar to that of the processing unit PU, the operation of the combining unit CU is timed by the binary sequence generated by the counter 500 (i.e., by the counter bits B2, B1, B1). At each clock period a sum value SV1 is calculated using different selected partial value and is stored into a register of the registers battery 518 depending on the value of the address ADD. Then, the values stored in the registers of the registers battery 518 are provided to the adder circuit 520 or the multiplier circuit 525 depending on the value of the address ADD, in order to implement the operations included in the equation (41).

The result of said operations, i.e., the symbol vector S, is then provided at the output of the multiplier circuit 530.

Summarizing, the decoder apparatus 155 according to the described embodiment of the present invention is capable of managing the operations for decoding transmissions encoded using both the Alamouti and ABBA schemes. This can be obtained thanks to the peculiarity of the processing unit PU included in the decoder apparatus 155, which can be configured to operate in two different ways, one corresponding to the Alamouti and one corresponding to the ABBA diversity schemes, using the same hardware resources. In particular, this is done acting on the time the reset signal RST is asserted for resetting the sequence generated by the counter circuit 300. Moreover, since the circuit structure of the processing unit PU is quite simple, including a single multiplier circuit and a single adder circuit only, the cost and the power consumption thereof are advantageously low.

In the following description there will be illustrated further embodiments of the present invention, according to which several portions of the processing unit PU are modified the in order to respond to different requirements.

Figure 6:
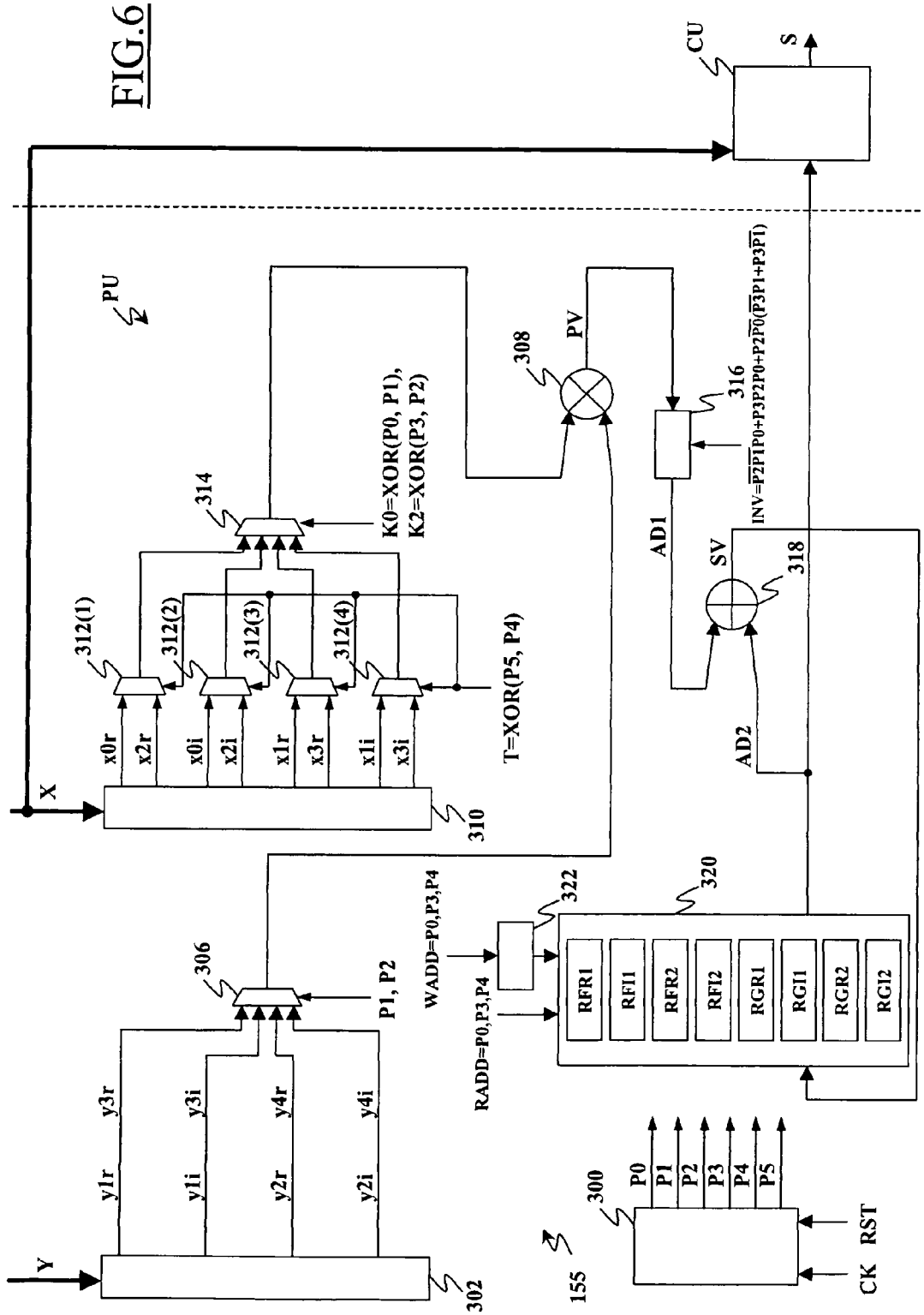
FIG. 6 schematically shows in terms of functional blocks the main functional components of a decoder apparatus used on a receiver side of the wireless telecommunication system of FIG. 1, according to a first alternative embodiment of the present invention.

In more detail, FIG. 6 shows an alternative solution for selecting the demodulated values y1r, y2r, y3r, y4r, y1i, y2i, y3i, y4i to be provided to the multiplier circuit 308 according to a first alternative embodiment of the present invention. According to this embodiment, the demodulated values y1r, y2r, y3r, y4r, y1i, y2i, y3i, y4i are acquired by the decoder apparatus 155 in a serial manner, following the sequence: y1r-y1i-y2r-y2i-y3r-y3i-y4r-y4i.

With respect to the embodiment of the invention illustrated in FIG. 3, in the processing unit PU according to this embodiment the multiplexers 304(i) are not provided, and the four inputs of the multiplexer 306 are directly coupled to the first register 302.

As previously described, the purpose of the multiplexers 304(i) of FIG. 3 was to select the demodulated values to be provided to the multiplexer 306 depending on the step of the constant geometry algorithm to be performed. Indeed, the counter bit P5 provided to the multiplexers 304(i) was used for discriminating the first two steps (i.e., those adapted to the generation of PV1 and PV2, for which the demodulated values y1r, y2r, y1i, y2i are selected) from the second two steps (i.e., those adapted to the generation of PV3 and PV4, for which the demodulated values y3r, y4r, y3i, y4i are selected).

In the embodiment illustrated in FIG. 6, the multiplexers 304(i) are no longer needed, since the demodulated values y1r, y2r, y1i, y2i are provided to the first register 302 before the demodulated values y3r, y4r, y3i, y4i. During the first two steps of the constant geometry algorithm, the first input of the multiplexer 306 receives the demodulated value y1r, the second input receives the demodulated value y1i, the third input receives the demodulated value y2r and the fourth input receives the demodulated value y2i. Then, during the last two steps of the constant geometry algorithm, the first input of the multiplexer 306 receives the demodulated value y3r, the second input receives the demodulated value y3i, the third input receives the demodulated value y4r and the fourth input receives the demodulated value y4i.

This solution allows reducing the circuit complexity of the processing unit PU, since the four multiplexers 304(i) do not need to be implemented and integrated.

Figure 7:
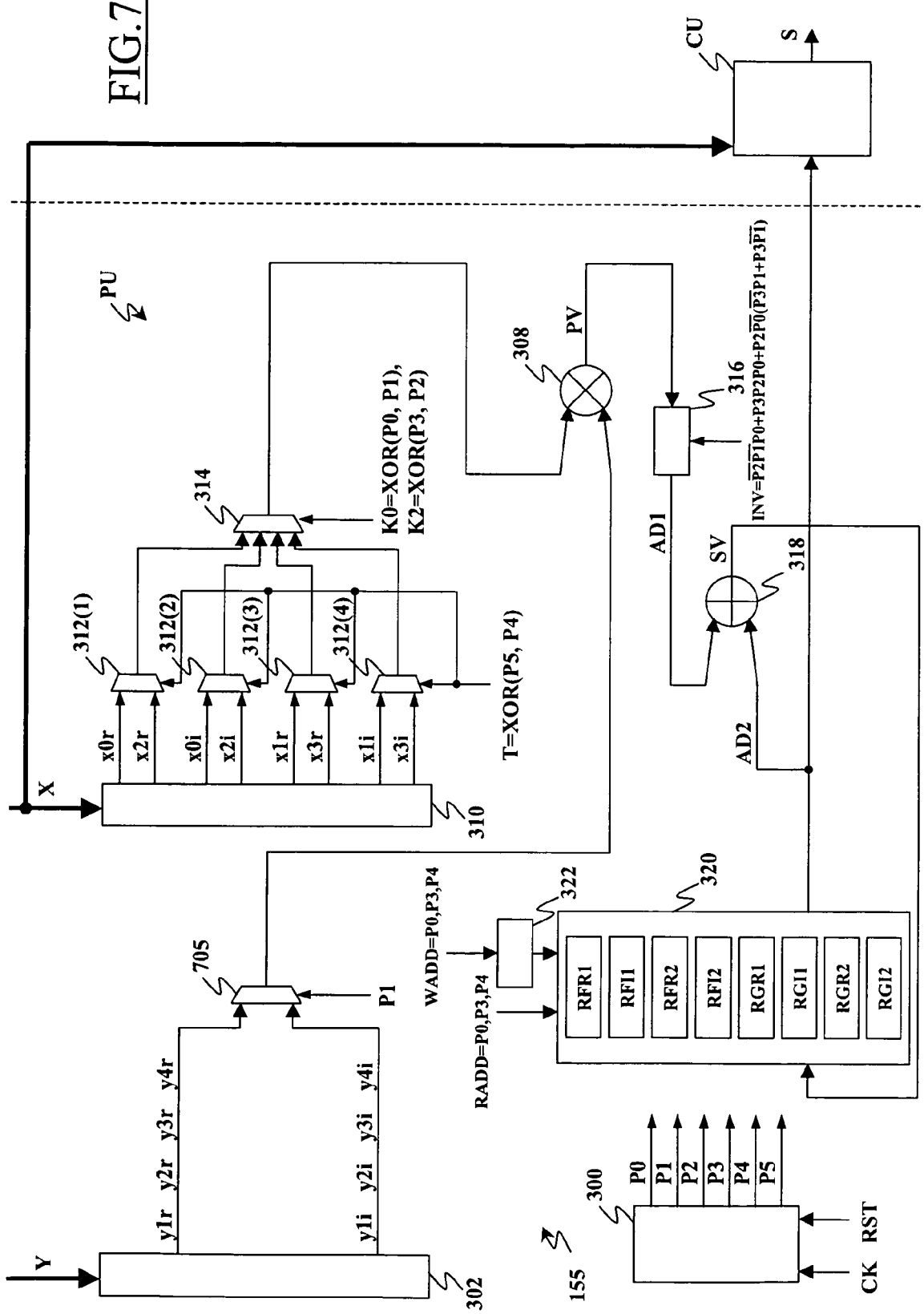
FIG. 7 schematically shows in terms of functional blocks the main functional components of a decoder apparatus used on a receiver side of the wireless telecommunication system of FIG. 1, according to a second alternative embodiment of the present invention.

FIG. 7 shows a further alternative solution for selecting the demodulated values y1r, y2r, y3r, y4r, y1i, y2i, y3i, y4i to be provided to the multiplier circuit 308 according to a second alternative embodiment of the present invention, that allows further reducing the circuit complexity of the processing unit PU. In the same way as in the embodiment of the present invention illustrated in FIG. 6, the demodulated values y1r, y2r, y3r, y4r, y1, y2i, y3i, y4i are acquired by the decoder apparatus 155 in a serial manner, following the sequence: y1r-y1i-y2r-y2i-y3r-y3i-y4r-y4i.

In the processing unit PU according to this embodiment, the four-input multiplexer 306 is replaced with a two-input multiplexer 705. The first input of the multiplexer 605 is directly coupled to the first register 302 for receiving the demodulated values y1r, y2r, y3r, y4r, the second input of the multiplexer 705 is directly coupled to the first register 302 for receiving the demodulated values y1i, y2i, y3i, y4i, the control terminal of the multiplexer 705 receives the counter bit P1, and the output of the multiplexer 705 is coupled to the multiplier circuit 308.

It has to be appreciated that with this simplified solution it is again possible to perform the four steps of the constant geometry algorithm, on condition that the calculation of the values $f_1, f_2, f_3, f_4$ is performed in a slightly different way. In more detail, making once more reference to the equation (37), illustrating the way the value $f_1$ is calculated, $$f_1 = x_{0r}y_{1r} - jx_{0i}y_{1r} + x_{0i}y_{1i} + jx_{0r}y_{1i} + x_{1r}y_{2r} + jx_{1i}y_{2r} - x_{1i}y_{2i} + jx_{1r}y_{2i},$$ (37)

it can be appreciated that by changing the order of the addends it is possible to perform the calculation of all the addends including the demodulated values y1r, y1i and then perform the calculation of all the addends including the demodulated values y2r, y2i. Since each demodulated symbol $y_1, y_2, y_3, y_4$ can be identified by exploiting the counter bits P2 and P5:

| P5 | P2 | Demodulated symbol |
|---|---|---|
| 0 | 0 | y1 |
| 0 | 1 | Y2 |
| 1 | 0 | y3 |
| 1 | 1 | y4 | the order of the addends can be changed by altering the ordered sequence generated by the 6-bit counter 300, changing the order of the counter bits in the sequence so as the sequence became P0, P1, P3, P4, P2, P5. In this way, all the operations needed for performing the calculations of the addends including the demodulated values y1r, y1i are performed before those needed for performing the calculations of the addends including the demodulated values y2r, y2i and so on. According to this embodiment of the invention, the selection of which between the real and imaginary parts is selected is performed exploiting the counter bit P1 controlling the multiplexer 705.

Figure 8:
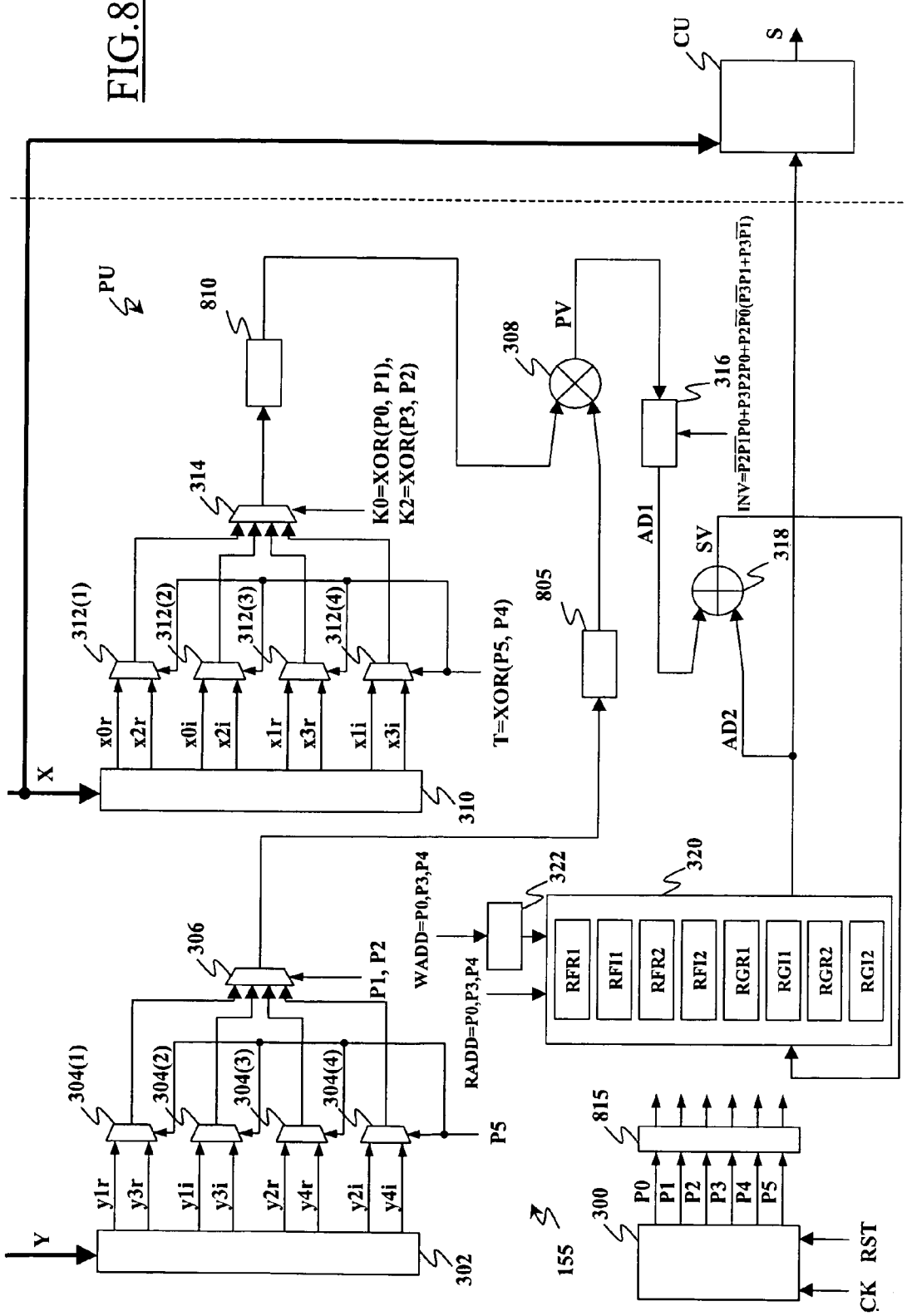
FIG. 8 schematically shows in terms of functional blocks the main functional components of a decoder apparatus used on a receiver side of the wireless telecommunication system of FIG. 1, according to a third alternative embodiment of the present invention.

In the embodiments disclosed hereinbefore, the multiplexer should have rapid switching times, in such a way to avoid wrong addend computations due to the provision of wrong values at the inputs of the multiplier 308. A possible solution for guaranteeing a correct synchronization of all the elements of the processing unit PU is illustrated in the FIG. 8, wherein a first pipeline register 805 has been added between the output of the multiplexer 306 and the corresponding input of the multiplier circuit 308, a second pipeline register 810 has been added between the output of the multiplexer 314 and the corresponding input of the multiplier circuit 308, and a third pipeline register 815 has been coupled to the outputs of the 6-bit counter 300. In this way, it is assured that the multiplier circuit 308 receives at each clock period the correct pair of values to be multiplied.

The pipeline dimension of the pipeline registers 805, 810, 815 (i.e., the number of different values corresponding to different and consecutive clock periods that each pipeline register 805, 810, 815 is able to store in a same time) strongly depends on the type of multiplier circuit 308 and adder circuit 318 included in the processing unit PU.

More particularly, modern adder and multiplier architectures are capable of carrying out operations on floating data exploiting internal pipeline structures, able to allow the functioning at higher frequencies. Regarding the multiplier circuit 308, it has to be appreciated that all the products calculated are independent one from each other, so, once the internal pipeline of the multiplier circuit 308 is full, it is sufficient to properly delay the circuit blocks that will make use of the results calculated thereby. Additional considerations need to be carried out regarding the adder circuit 318. Indeed, the adder circuit 318 is connected in a feedback loop connecting the reading value output with the write value input of the register battery 320. This may cause problems in case the adder circuit 318 receives a temporary value that has not been saved in the register battery 320 yet (this is a common drawback of the Reduced Instruction Set Computer (RISC) architectures). This problem can be overcome by guaranteeing that the generic value stored in the register battery 320 is not outputted to the adder circuit 318 as long as it has not been stored into one of the eight 32-bit registers included in the register battery 320. For this purpose, the pipeline dimension of the adder circuit 318 needs to be equal to the number of registers included in the register battery 320 (i.e., eight).

Naturally, in order to satisfy local and specific requirements, a person skilled in the art may apply to the solution described above many modifications and alterations. Particularly, although the present invention has been described with a certain degree of particularity with reference to described embodiment(s) thereof, it should be understood that various omissions, substitutions and changes in the form and details as well as other embodiments are possible. Moreover, it is expressly intended that specific elements and/or method steps described in connection with any disclosed embodiment of the invention may be incorporated in any other embodiment as a general matter of design choice. Embodiments of the present invention may be utilized in a variety of different kinds of electronic devices, such as cellular telephones, and which, in turn, may be contained in a variety of different types of electronic systems, such as cellular telephone communications networks.

The invention claimed is:

1. A decoder apparatus for decoding a first input set of demodulated data elements obtained by demodulating transmitted data elements received over a transmission channel so as to obtain a corresponding output set of decoded data elements, the decoder apparatus including:
- a first register operable to receive the demodulated data elements of the first input set;
- a second register operable to receive a second input set of channel description elements related to the transmission channel,
- wherein the number of demodulated data elements of the first input set and the number of channel description elements of the second input set being equal to a first number that depends on a selected transmission diversity scheme selected among at least two transmission diversity schemes that can be adopted for the transmission of the transmitted data elements;
- a first selector coupled to the first register and operable to select the demodulated data elements from the first input set;
- a second selector coupled to the second register and operable to select the channel description elements from the second input set;
- a combiner coupled to the first and the second selectors and operable to combine the selected demodulated data elements with the selected channel description elements; and
- a controller coupled to the first and second selectors and to the combiner, and adapted to generate a plurality of signals defining a control sequence for driving the first and second selectors and the combiner, wherein said controller is adapted to be configured so as to generate at least two control sequences according to the selected transmission diversity scheme.

2. The decoder apparatus of claim 1, wherein the at least two transmission diversity schemes include:
- a first, Alamouti transmission diversity scheme, for which the first number is equal to two;
- a second, ABBA transmission diversity scheme, for which the first number is equal to four.

3. The decoder apparatus of claim 2, wherein:
- the controller is operable to generate a first control sequence when the first transmission diversity scheme is adopted, the first control sequence being adapted to drive the first and second selectors so as to select two pairs of demodulated data elements and channel description elements; and
- the controller is operable to generate a second control sequence when the second transmission diversity scheme is adopted, the second control sequence including the first control sequence followed by a repetition of three modified first control sequences each one of the three modified control sequences being modified, compared to the first control sequence, in such a way that the two pairs of demodulated data elements and channel description elements that are selected are different.

4. The decoder apparatus of claim 3, wherein the first control sequence and each of the three modified control sequences are adapted to drive the combiner for combining the selected two pairs of demodulated data elements and channel description elements according to a matrix product operation between a channel matrix and a demodulated vector, wherein the channel matrix is an Alamouti matrix whose elements are the two selected channel description elements and the elements of the demodulated vector are the two selected demodulated data elements.

5. The decoder apparatus of claim 4, wherein the combiner includes:
- a multiplier having a first input coupled to the first selector for receiving a selected demodulated data element, a second input coupled to the second selector for receiving a selected channel description element and an output for providing a first addend value equal to the selected demodulated data value multiplied by the selected channel description value; and
- an adder having a first input for receiving the first addend value, a second input for receiving a second addend value stored in a third register, and an output for providing a summed value equal to the first addend summed with the second addend to the third register.

6. The decoder apparatus of claim 5, wherein the third register includes four sub-registers, each one corresponding to a generic base operation.

7. The decoder apparatus of claim 6, wherein each generic base operation includes the repetition of two operations, each one including the calculation of four summed values, the first addend being obtained exploiting different selected demodulated data elements and channel description elements for each summed value, the second addend being provided by the corresponding sub-register and each summed value being stored thereinto.

8. The decoder apparatus of claim 7, wherein the controller is a counter and the signals defining the sequence are digital signals adapted to assume two different values.

9. The decoder apparatus of claim 8, wherein at least one among the first and the second selectors, the combiner and the controller is an electronic circuit.

10. The decoder apparatus of claim 8, wherein the first and second selectors include a tree-structure of multiplexers including:
- input terminals coupled to the first and second registers, respectively, for receiving the demodulated data and channel description elements, respectively;
- output terminals coupled the first and second inputs, respectively, for providing a selected demodulated data and channel description elements, respectively; and
- control terminals receiving the signals generated by the counter.

11. The decoder apparatus of claim 10, wherein each demodulated data and channel description element includes a real and an imaginary parts.

12. The decoder apparatus of claim 11, wherein each sub-register includes a corresponding real register adapted to store the real part of the summed value and an imaginary register adapted to store the imaginary part of the summed value.

13. An apparatus, including:
- a receiver apparatus adapted to pick up transmitted data elements;
- a demodulator circuit adapted to receive the transmitted data element from the receiver apparatus for generating a corresponding first input set of demodulated data elements;
- a channel estimator circuit adapted to receive the transmitted data element from the receiver apparatus for generating a corresponding second input set of channel description elements related to the transmission channel; and
- a decoder apparatus for receiving the first input set of demodulated data elements and the second input set of channel description elements for obtaining a corresponding output set of decoded data elements, wherein the decoder apparatus includes the decoder apparatus of claim 1.

14. A mobile communication device, comprising:
a receiver apparatus configured to detect transmitted data elements;
a demodulator circuit configured to receive the transmitted data element from the receiver apparatus and generate a corresponding first input set of demodulated data elements;
a channel estimator circuit configured to receive the transmitted data element from the receiver apparatus to generate a corresponding second input set of channel description elements related to the transmission channel;
a decoder apparatus configured to receive the first input set of demodulated data elements and the second input set of channel description elements for obtaining a corresponding output set of decoded data elements, wherein the decoder apparatus includes the decoder apparatus of claim 1;
a transmitter configured to transmit data elements over a transmission channel; and
at least one receiver configured to receive the transmitted data elements.

15. A wireless telecommunication system, comprising:
a receiver apparatus configured to detect transmitted data elements;
a demodulator circuit configured to receive the transmitted data element from the receiver apparatus and generate a corresponding first input set of demodulated data elements;
a channel estimator circuit configured to receive the transmitted data element from the receiver apparatus to generate a corresponding second input set of channel description elements related to the transmission channel;
a decoder apparatus configured to receive the first input set of demodulated data elements and the second input set of channel description elements for obtaining a corresponding output set of decoded data elements, wherein the decoder apparatus includes the decoder apparatus of claim 1;
a transmitter configured to transmit data elements over a transmission channel; and
at least one receiver configured to receive the transmitted data elements.

16. A method for decoding a first input set of demodulated data elements obtained by demodulating transmitted data elements received over a transmission channel so as to obtain a corresponding output set of decoded data elements, the method including the steps of:
receiving the demodulated data elements of the first input set;
receiving a second input set of channel description elements related to the transmission channel, the number of demodulated data elements of the first input set and the number of channel description elements of the second input set being equal to a first number that depends on a selected transmission diversity scheme selected among at least two transmission diversity schemes that can be adopted for the transmission of the transmitted data elements;
selecting the demodulated data elements from the first input set;
selecting the channel description elements from the second input set;
combining the selected demodulated data elements with the selected channel description elements, wherein the method further includes the step of:
generating a plurality of signals defining a control sequence for controlling the selection of the demodulated data elements and of the channel description elements and for controlling the combination of the selected demodulated data elements with the selected channel description elements, said sequence being configurable according to the selected transmission diversity scheme.

17. A decoder circuit, comprising:
a first register configured to receive a first input set of demodulated data elements;
a second register configured to receive a second input set of transmission channel description elements;
a first selection circuit coupled to the first register and operable to select demodulated data elements from the first input set;
a second selection circuit coupled to the second register and operable to select channel description elements from the second input set;
a combiner circuit coupled to the first and the second selection circuits and operable to combine the selected demodulated data elements and channel description elements; and
a control circuit coupled to the first and second selection circuits and to the combiner circuit, the control circuit operable to control the first and second selection circuits and the combiner circuit to implement at least two transmission diversity schemes and to control the first and second selection circuits and the combiner circuit according to one of the diversity schemes to generate an output set of decoded data elements.

18. The decoder circuit of claim 17 wherein the number of demodulated data elements of the first input set and the number of channel description elements of the second input set are equal to a first number that depends on the transmission diversity scheme selected from the at least two transmission diversity schemes.

19. The decoder circuit of claim 17 wherein the control circuit controls the control circuit is operable to control the first and second selection circuits and the combiner circuit to implement either an Alamouti transmission diversity scheme or an ABBA transmission diversity scheme.

20. The decoder circuit of claim 17 wherein the control circuit is operable to generate a first control sequence of control signals to control the first and second selection circuits and the combiner circuit when a first transmission diversity scheme is being implemented and to generate a second control sequence of control signals to control the first and second selection circuits and the combiner circuit when a second transmission diversity scheme is being implemented.

* * * * *

UNITED STATES PATENT AND TRADEMARK OFFICE
CERTIFICATE OF CORRECTION

| | |
|---|---|
| PATENT NO. | : 8,019,030 B2 |
| APPLICATION NO. | : 12/152860 |
| DATED | : September 13, 2011 |
| INVENTOR(S) | : Nicolo' Ivan Piazzese et al. |

It is certified that error appears in the above-identified patent and that said Letters Patent is hereby corrected as shown below:

- In Claim 14, Column 29, Line 21 of the patent, "the decoder apparatus includes the decoder apparatus of" should read --the decoder apparatus includes the decoder apparatus register of--.

Signed and Sealed this
Seventeenth Day of April, 2012

David J. Kappos
*Director of the United States Patent and Trademark Office*